(12) United States Patent
Fishman

(10) Patent No.: US 8,508,594 B2
(45) Date of Patent: Aug. 13, 2013

(54) SURFACE CAMERA SYSTEM

(75) Inventor: James B. Fishman, Cicero, IN (US)

(73) Assignee: ON-BOARD VIDEO, Ltd., Cicero, IN (US)

( * ) Notice: Subject to any disclaimer, the term of this patent is extended or adjusted under 35 U.S.C. 154(b) by 917 days.

(21) Appl. No.: 12/367,961

(22) Filed: Feb. 9, 2009

(65) Prior Publication Data

US 2009/0201413 A1 Aug. 13, 2009

Related U.S. Application Data

(60) Provisional application No. 61/065,102, filed on Feb. 9, 2008.

(51) Int. Cl.
*H04N 7/18* (2006.01)
(52) U.S. Cl.
USPC .......................................... 348/149; 348/151
(58) Field of Classification Search
USPC .................................. 348/149, 151
See application file for complete search history.

(56) References Cited

U.S. PATENT DOCUMENTS

| | | | | |
|---|---|---|---|---|
| 4,514,068 A * | 4/1985 | Urquhart | ...................... | 396/427 |
| 4,667,656 A * | 5/1987 | Yabe | ............................ | 600/109 |
| 5,894,369 A * | 4/1999 | Akiba et al. | .................. | 359/820 |
| 6,597,293 B1 * | 7/2003 | Harrison | ........................ | 340/944 |
| 6,894,717 B2 * | 5/2005 | Bakewell | ...................... | 348/149 |
| 7,023,361 B1 * | 4/2006 | Wallace et al. | ................ | 340/952 |
| 7,688,222 B2 * | 3/2010 | Peddie et al. | .................. | 340/905 |
| 2002/0089176 A1 * | 7/2002 | Iwasaki | ............................ | 285/92 |
| 2008/0013944 A1 * | 1/2008 | Yamane et al. | ................ | 396/427 |
| 2008/0144197 A1 * | 6/2008 | Hong et al. | ..................... | 359/824 |
| 2009/0256914 A1 * | 10/2009 | Silverman | ...................... | 348/157 |

FOREIGN PATENT DOCUMENTS

WO WO99/18554 * 4/1999
WO WO2005/086111 A1 * 9/2005

OTHER PUBLICATIONS

Mavromatic. Road Studs That Can Monitor Your Speed, Issue A Ticket. 2006. www.mavromatic.com.*
Myers, Jim, "Nights of 'Thunder'// Oval Track Comes Right into Living Room // Down-home Racing gets Big Exposure," USAToday. com, Jul. 18, 1991, printed Jun. 24, 2009, 2 pgs.
Potts, John, "Settling the Gopher Cam Debate, and the NASCAR TV Weekend That Was The Race for Ratings Points: Critiquing NASCAR TV," www.frontstretch.com, Mar. 11, 2009, printed Jun. 24, 2009, 2 pgs.
"Meet the Original 'Gopher Cam,'" dalyplanet.blogspot.com, Feb. 19, 2008, printed Jun. 24, 2009, 9 pgs.
Pictures of "Treadcam" device used in 2006, 6 pages.

* cited by examiner

*Primary Examiner* — Lynn Feild
*Assistant Examiner* — Bryan Lee
(74) *Attorney, Agent, or Firm* — Barnes & Thornburg LLP

(57) ABSTRACT

A surface camera system includes a support housing configured to be embedded in the surface of a track and a camera housing couplable to the support housing. A camera is coupled to the camera housing and may be embodied as a high definition camera or a standard definition camera. The camera housing includes a top surface shaped and sized so as not to interfere with traffic on the track.

10 Claims, 24 Drawing Sheets

SURFACE CAMERA SYSTEM

This patent application claims priority to and the benefit of U.S. Provisional Patent Application Ser. No. 61/065,102, entitled "Surface Camera System," which was filed on Feb. 9, 2008, the entirety of which is expressly incorporated herein by reference.

TECHNICAL FIELD

The present disclosure relates generally to camera systems, and particularly to camera systems for use in the surface of tracks or roadways.

BACKGROUND

Point-of-view cameras have been used in various events to provide spectators video and/or images from a participant's perspective and/or a particular vantage point. Such cameras may be secured to a participant of the event, a device used in the event, or other structure, such as a vehicle, to provide video and images from the point of view of the participant or vantage point. Cameras of various shapes and sizes are used depending upon the particular application. Typical cameras are high-tech devices, which are non-resilient to rough handling and hazardous environments.

SUMMARY

According to one aspect, a camera system may include a support housing, a camera housing, and a high definition camera. The support housing may be configured to be embedded in the surface of a track. The camera housing may be coupable to the support housing in one of a plurality of orientations. The camera housing may include a domed upper surface and a window positioned in a recessed area of the domed upper surface. The high definition camera may be secured to the camera housing such that a field of view of a lens of the high definition camera extends through the window of the camera housing. In some embodiments, the track may be embodied a motor-sports track, a public street, or an airport runway.

Additionally, the camera system may include an adaptor coupled to the camera housing and the high definition camera. The adaptor may include a mirror positioned to redirect the field of view of the lens of the high definition camera through the window of the camera housing. In some embodiments, the position of the mirror may be adjustable relative to the lens of the high definition camera. Additionally, the adaptor may include a lens. The lens may have a lens diameter of less than about 0.75 inches. For example, in some embodiments, the lens has a lens diameter of about 0.5 inches. Additionally, the adaptor may include a locking ring. The locking ring may have an internal passageway sized to receive the lens. The locking ring may also include a threaded aperture and a fastener received in the threaded aperture. The fastener may contact the lens to fix the focus of the lens to a predetermined setting.

In some embodiments, the recess area of the domed upper surface may have a generally wedge shape. In such embodiments, the recess area may be defined by a bottom wall, a first side wall, a second side wall, and a back wall. The window of the camera housing may be positioned in the back wall. Additionally, in some embodiments, the camera housing may include a port defined in the domed upper surface, the port including an opening pointed toward the window. Further, the camera system may include a conduit positioned in the port in some embodiments. Additionally, the camera housing may include a microphone in some embodiments. The camera system may yet further include an actuator located in the support housing and operably coupled to the camera housing to rotate the camera housing about an axis in some embodiments.

According to another aspect, a camera system may include a support housing, a camera housing coupable to the support housing, and a camera coupled to the camera housing. The support housing may be configured to be embedded in the surface of a track. The camera housing may be coupable to the support housing in one of a plurality of orientations such that a top surface of the camera housing is substantially flush with a top rim of the support housing. The camera housing may include a domed protrusion extending upwardly from the top surface of the camera housing. The domed protrusion may include a passageway defined therein. In some embodiments, at least a portion of the camera may be positioned in the passageway.

In some embodiments, the domed protrusion of the camera housing may include a front surface defined at an angle less than about 60 degrees relative to the top surface of the camera housing. In such embodiments, the front surface may include an opening of the passageway. Additionally, in some embodiments, the domed protrusion may have a slope of about 10 degrees or less relative to the top surface of the camera housing. For example, in some embodiments, the front surface of the domed protrusion may have a slope of about 7 degrees relative to the top surface of the camera housing.

According to a further aspect, a track may include a top road surface, a cylindrical housing embedded in the top surface, a camera housing coupled to the cylindrical housing, and a camera coupled to the camera housing and configured to generate image data from a vantage point defined on the top road surface. The housing may include a rim substantially flush with the top surface. The camera housing may include a window positioned in the domed top surface. The window may be substantially flush with the top road surface. In some embodiments, domed top surface may extend above the top road surface no more than 0.5 inches.

BRIEF DESCRIPTION OF THE DRAWINGS

The detailed description particularly refers to the following figures, in which.

DETAILED DESCRIPTION OF THE DRAWINGS

Figure 1:
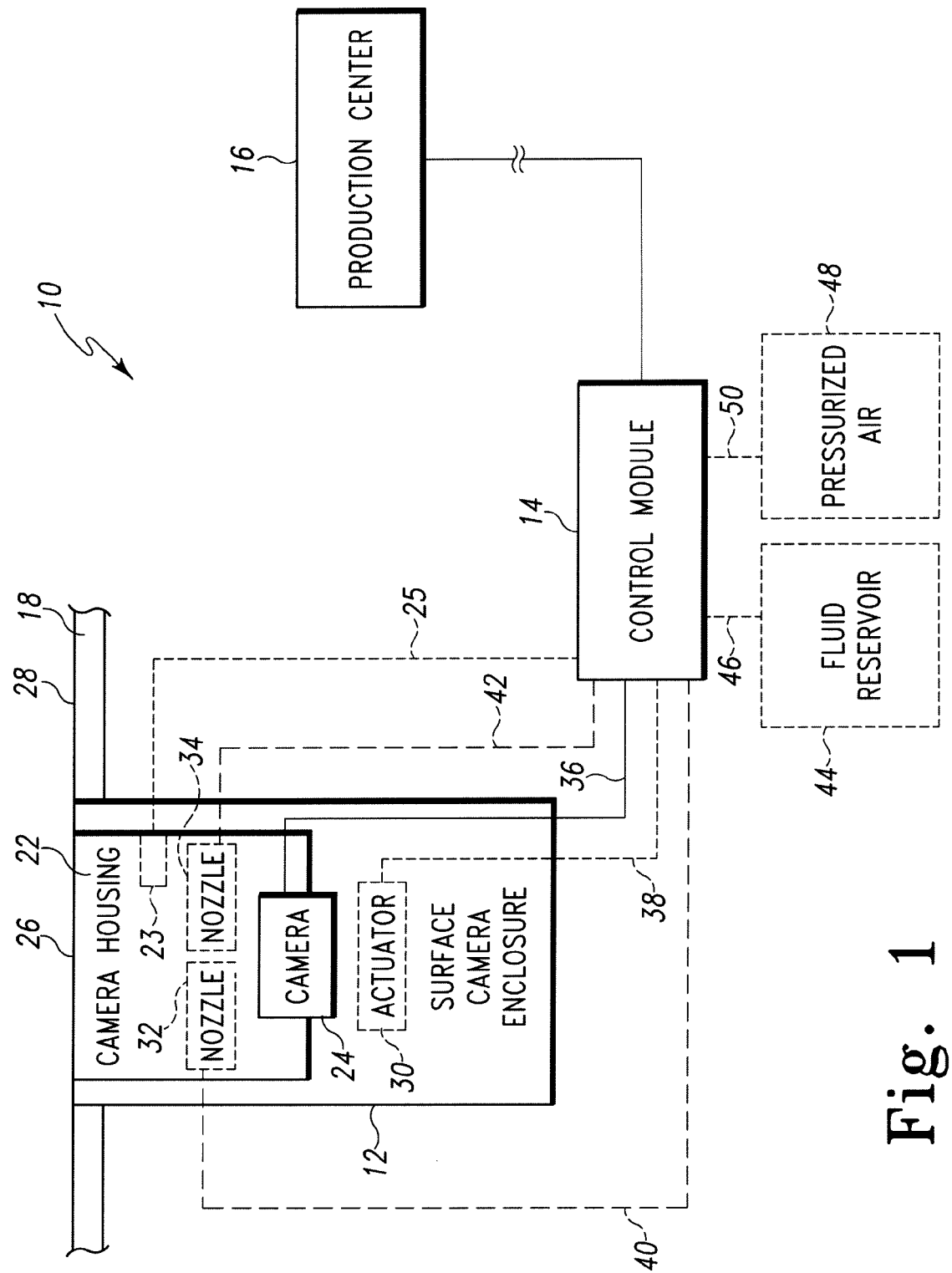
FIG. 1 is a block diagram of one embodiment of a surface camera system.

While the concepts of the present disclosure are susceptible to various modifications and alternative forms, specific exemplary embodiments thereof have been shown by way of example in the drawings and will herein be described in detail. It should be understood, however, that there is no intent to limit the concepts of the present disclosure to the particular forms disclosed, but on the contrary, the intention is to cover all modifications, equivalents, and alternatives falling within the spirit and scope of the invention as defined by the appended claims.

Referring to FIG. 1, in one embodiment, a surface camera system 10 includes a surface camera assembly 12, a control module 14 located remotely from the camera assembly 12, and a production center 16. The camera assembly 12 is configured to be embedded in the surface of a track 18. The track 18 may be embodied as any type of track or roadway including, but not limited to, a motor-sports raceway track, a horse track, a public street, an airport runway, or other track, roadway, street, or path configured to support vehicular and/or pedestrian traffic.

The camera assembly 12 includes a support housing 20 and a camera housing 22 coupled to the support housing 20. A camera 24 is secured in the camera housing 20. The camera 24 is illustratively embodied as a high-definition camera, but may be a standard definition camera in some embodiments. For example, in one particular embodiment, the camera 24 is embodied as a high definition camera model number FCB-H10, which is commercially available from Sony Corporation of America of New York, N.Y. However, in another particular embodiment, the camera 24 is embodied as a standard definition camera model number QN42, which is commercially available from Elmo Company, Limited of Plainview, N.Y.

The camera housing 22 is coupled to the support housing 20 such that the a top surface 26 of the housing 22 is generally flush with a top surface 28 of the track 18 so as to reduce disturbance to vehicles or other objects traveling over the camera housing 22. In some embodiments, as discussed in more detail below, the top surface 26 of the camera housing 22 may be generally dome-shaped and include a window positioned therein such that the camera 24 has a clear view of the track 18 in a particular direction. In such embodiments, the camera 24 may or may not be located in the camera housing 22. In other embodiments, the camera housing 22 may include a small dome protrusion that extends upwardly from the top surface 26 of the camera housing 22 such that the camera 24 has a clear view of the track 18 in a particular direction. In such embodiments, a portion of the camera 24 may be located in the camera housing 22.

The support housing 20 and the camera housing 22 may be formed from any material sturdy enough to withstand the forces exerted on the track 18. For example, in embodiments wherein the surface camera assembly 12 is embedded in a motor-sport track, the support housing 20 and camera housing 22 may be formed from steel, cast aluminum, or other hard metal. However, in other embodiments, the housings 20, 22 may be formed from other materials such as plastics, ceramics, or the like.

In some embodiments, the camera housing 22 may be coupled to the support housing 20 in one of a number of orientations such that the camera 24 is directed toward any one of a number of directions. A new camera angle may be obtained by rotating or otherwise positioning the camera housing 22 in a new orientation with respect to the support housing 20 and securing the camera housing 22 in place. Additionally or alternatively, in some embodiments, the surface camera assembly 12 may include an actuator 30 and associated linkage, which is coupled to the camera housing 22. The actuator 30 is operable to rotate or otherwise move the camera housing 22 to one of a number of different orientations such that a plurality of camera angles are available. Additionally, in some embodiments, the camera housing 22 may also include one or more ports or openings 32, 34 for dispensing a cleaning solution and/or air onto a window of the camera housing 22 and/or the lens of the camera 24. Further, in some embodiments, the surface camera assembly may include a microphone 23, which may be coupled to the camera housing 22 or the support housing 20.

As discussed above, the control module 14 is located remotely from the surface camera assembly 12. Depending on the type of camera 24, the distance at which the control module 14 is positioned relative to the camera 24 may be limited. For example, in one particular embodiment, the control module 14 is located within about fifty feet of the camera 24 to ensure good signal levels. The control module 14 is communicatively coupled to the camera 24 via a number of interconnects 36. The interconnects 36 may be embodied as any type of interconnects capable of facilitating communication between the camera 24 and the control module 14. For example, the interconnects 36 may be embodied as any number of wires, cables, printed circuit board traces, vias, and/or the like.

In embodiments wherein the surface camera assembly 12 includes the actuator 30, the control module 14 may be coupled to the actuator 30 via a number of interconnects 38. The interconnects 38 may be similar to the interconnects 36 and may be embodied as any type of interconnects capable of facilitating communication between the control module 14 and the actuator 30. In embodiments wherein the surface camera assembly 12 includes the microphone 23, the control module 14 may be coupled to the microphone 23 via a number of interconnects 25, which may be embodied as any type of interconnects capable of facilitating communication between the control module 14 and the microphone 23. In addition, in embodiments wherein the surface camera assembly 12 includes the ports 32, 34, the control module 14 may be coupled to the nozzles 32, 34 via a number of conduits 40, 42. The conduits 40, 42 may be embodied as any type of conduit or tube capable of transporting the cleaning solution, solvent, and/or air for the cleaning of the lens of the camera 24 and/or window of the camera housing 22. Additionally, in such embodiments, the control module 14 may include or otherwise be coupled to a number of reservoirs for storing the cleaning solution and/or air. For example, the control module 14 may be coupled to a fluid reservoir 44 for holding an amount of cleaning fluid or solvent via a conduit 46 and to a pressurized air reservoir 48 via a conduit 50.

The control module 14 may include any number of circuits, modules, and/or devices for controlling the camera 24 and processing video and/or images received therefrom. In addition, in embodiments wherein the camera housing 22 includes the ports 32, 34, the control module 14 may include control circuits and other devices such as pumps or the like for transporting solvent and air from the reservoirs 44, 48 to the ports 32, 34.

The production center 16 may be embodied as a number devices depending upon the particular application of the system 10. For example, the production center 16 may include any number of monitors, computers, video and image processors, receivers, transmitters, and/or other electrical and mechanical devices. The production center 16 may be embodied as a fixed production center such as a building or room or a mobile production center such as a mobile vehicle. As such, the production center 16 may be located remotely from the control module 14. The production center 16 is communicatively coupled to the control module 14 via a number of interconnects 52. The interconnects 52 may be embodied as any type of interconnects capable of facilitating communication between the production center 16 and the control module 14. For example, the interconnects 52 may be embodied as any number of wires, cables, printed circuit board traces, vias, and/or the like. In one particular embodiment, the interconnects 52, or a portion thereof, are embodied as a number of fiber optic cables, which carry the video and/or images generated by the camera 24 and the control module 14.

In use, the surface camera assembly 12 is embedded in the surface of the track 18. To do so, a hole sized for the assembly 12 may be formed in the track 18 by drilling or other means. The assembly 12 may be inserted into the hole and secured therein via mechanical restraints and/or adhesives. The hole may be "patched" around the assembly 12 using concrete, asphalt, or other material that may or may not match the remaining surface of the track 18. The interconnects 36, 38 and conduits 40, 42 may be routed from the surface camera assembly 12, under the track 18, and to the control module 14. During an event, such as a motor-sporting event, the camera 24 may be used to generate images and video of the point-of-view of the top surface 28 of the track 18.

The video and images data is transmitted from the camera 24 to the control module 14 via the interconnect 36. The control module 14 may be configured to process the video/image data before transmitting the video and images to the production center 16 via the interconnect 52. For example, in embodiments wherein the camera 24 is a standard definition camera, the control module 14 may be configured to "up convert" the standard definition image/video to a high-definition format. The video and/or images may be viewed and further processed in the production center 16 before transmission to remote viewing devices such as spectator televisions.

In embodiments wherein the surface camera assembly 12 includes the actuator 30, the control module 14 may be responsive to control signals received from the production center 16 to activate or otherwise control the actuator 30. That is, the camera housing 22 and camera 24 may be remotely positioned from the production center via use of the control module 14 and the actuator 30. Additionally, in embodiments wherein the camera housing 22 includes the ports or openings 32, 34, the control module 14 may be responsive to control signals received form the production center 16 to pump an amount of cleaning solution or solvent from the fluid reservoir 44 and/or an amount of air from the pressurized air reservoir 48 through the conduits 40, 42. In this way, a user of the production center 16 may clean the lens of the camera 24 and/or a window of the camera housing 22 remotely. In such embodiments, replaceable film and the like are not required to ensure a clean view for the camera 24.

Figure 2:
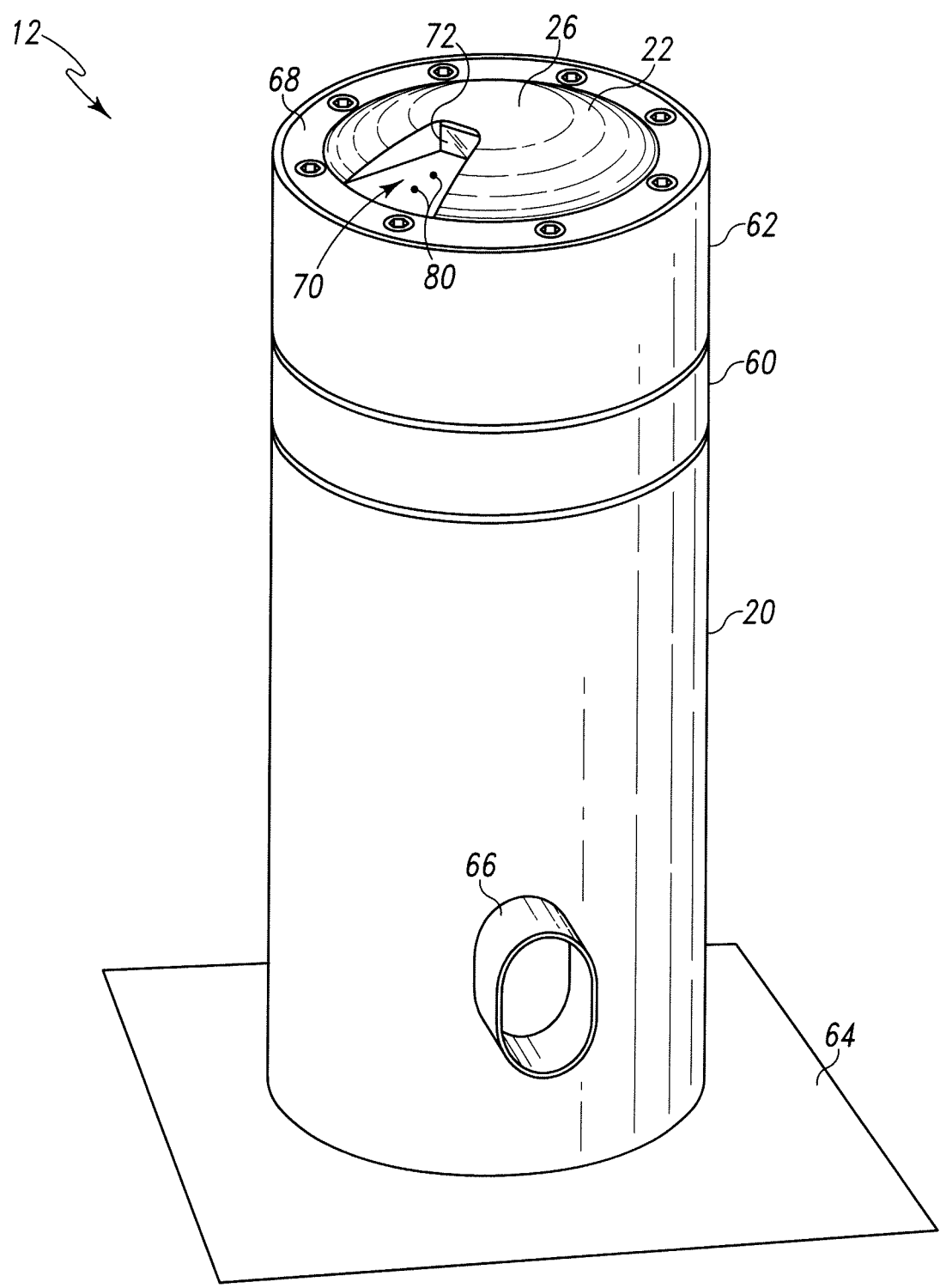
FIG. 2 is a perspective view of one embodiment of a surface camera assembly of the surface camera system of FIG. 1.
Figure 3:
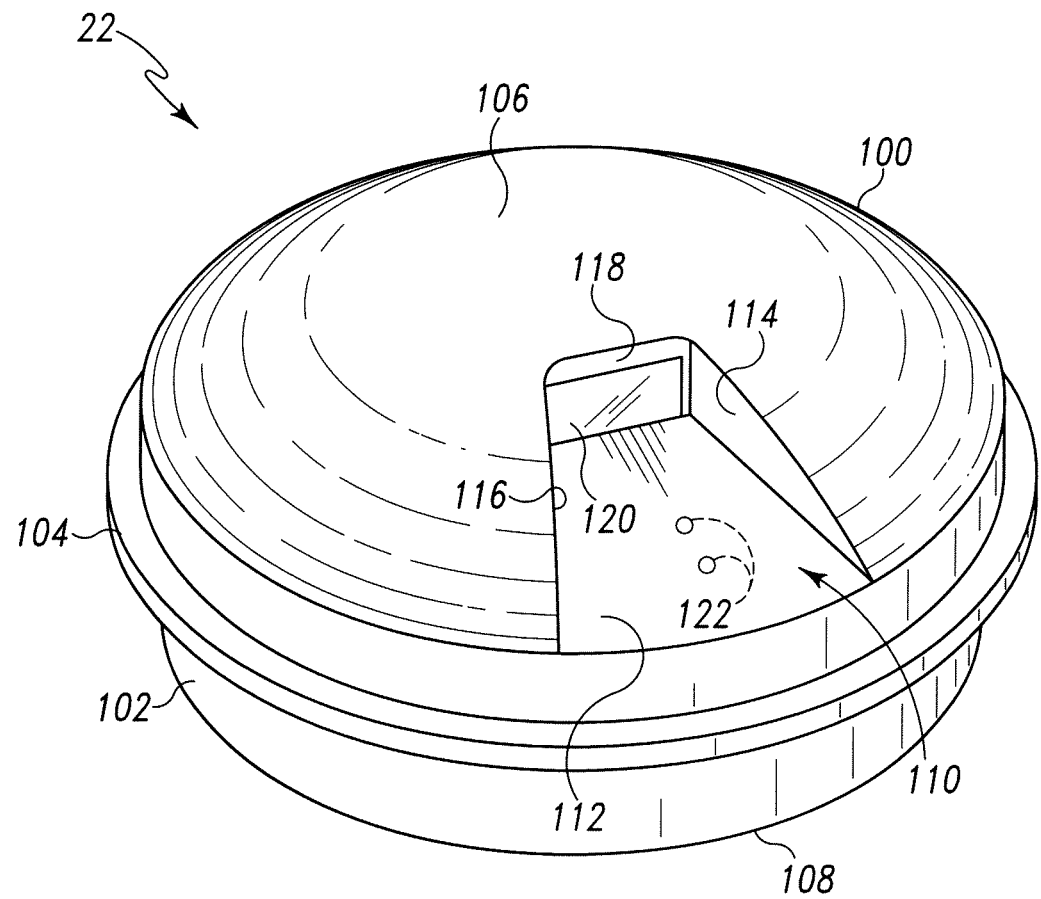
FIG. 3 is top perspective view of one embodiment of a camera housing of the surface camera assembly of FIG. 2.
Figure 4:
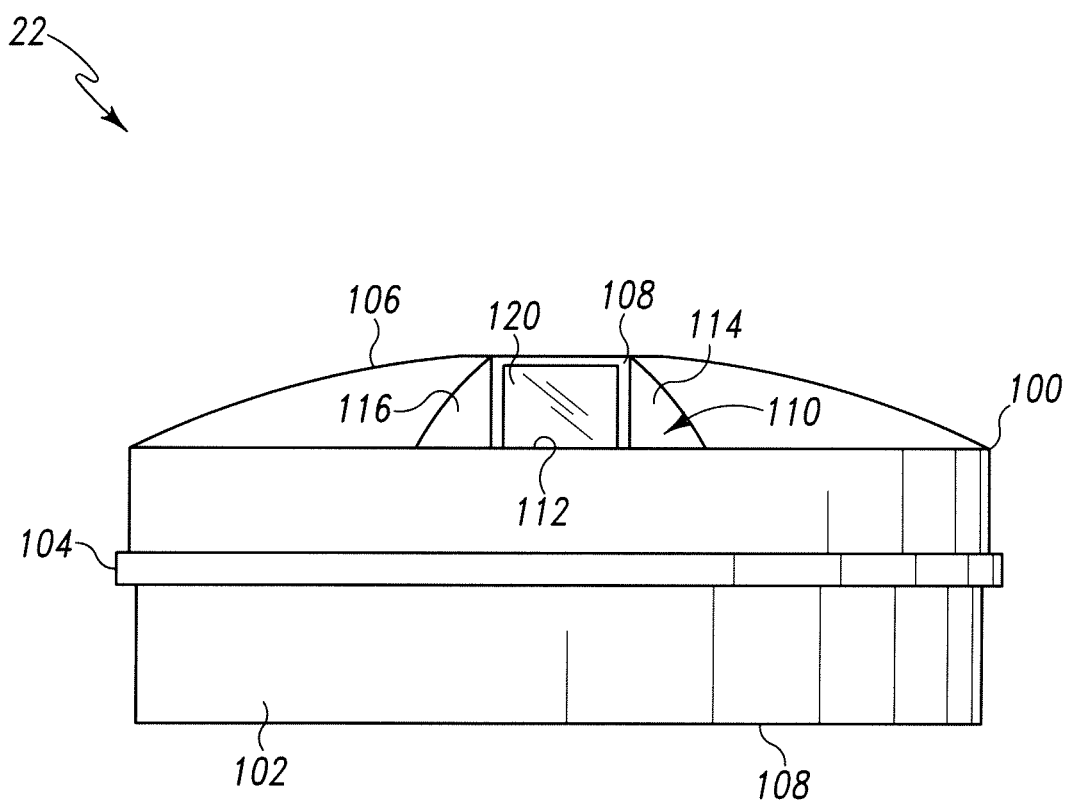
FIG. 4 is a bottom elevational view of the camera housing of FIG. 3.

Referring now to FIG. 2, in one embodiment, the surface camera assembly 12 includes the support housing 20, a first spacer 60, a second spacer 62, and the camera housing 22. In the illustrative embodiment, the support housing 20 has a substantially cylindrical shape, but may have other shapes in other embodiments including, but not limited to, hexagonal, rectangular, oval, and/or the like. Additionally, in some embodiments, a base plate 64 may be secured to the bottom of the support housing 20. The base plate 64 may have a rectangular shape as shown in FIG. 2, a circular shape, or other shape based on the particular application. The support housing 100 may also include a conduit port 66. In use, the interconnects 36, 38 and the conduits 40, 42 are routed to the camera housing 22 and camera 24 through the conduit port 66.

The spacers 60, 62 are used to adjust the height of the camera housing 22 relative to the support housing 20. Any number of spacers of various heights may be used in particular applications. That is, although the illustrative camera assembly 12 of FIG. 2 includes two spacers 60, 62, any number of spacers may be used in other embodiments. Additionally, the spacers may be of various heights. For example, the first spacer 60 is a "small" spacer and may have a height of about one to three inches in some embodiments. The second spacer 62 is a "large" spacer and may have a height of about three to six inches in some embodiments. The spacers 60, 62 have a shape similar to the support housing 20 and are configured to be coupled to each other and/or the housing 20.

In the illustrative embodiment of FIG. 2, the camera housing 22 is secured to the second spacer 62 (or to the housing 20 in embodiments without the spacers 60, 62) via a retainer ring 68. In the illustrative embodiment, the retainer ring 68 is secured to the second spacer 62 and secures the camera housing 22 in place via compression forces between the retainer ring 68 and the spacer 62. However, in other embodiments, the retainer ring 68 may be secured to or otherwise be coupled directly to the camera housing 22. As discussed above, the camera housing 22 may be secured in any orientation relative to the support housing 20 via the retainer ring 68. Additionally, the position or orientation of the camera housing 22 may be altered by removing the retainer ring, re-orientating the camera housing 22, and re-securing the retainer ring 68 to secure the camera housing 22 in the new orientation/position.

In the illustrative embodiment of FIG. 2, the upper or top surface 26 of the camera housing 22 is generally domed-shaped and includes a pie-shaped recess 70 defined therein. A camera window 72 is positioned in the recess 70 to provide a viewing port for the camera 24. As discussed in more detail below, a portion of the camera 24 may be positioned within or otherwise coupled to the camera housing 22. In some embodiments, the camera housing 22 may include one or more ports or openings 80 similar to the ports 32, 34. The ports 80 are positioned in the camera housing 22 such that liquid and/or air ejected therefrom is received on the window 72 of the housing 22 and/or a lens of the camera 24.

Referring now to FIGS. 3-7, in one particular embodiment, the camera housing 22 is embodied as a camera housing 100 having a cylindrical shape defined by a curved sidewall 102. The housing 100 includes a lip 104 extending about the mid-section of the sidewall 102, which is used to position and secure the housing 100 to the support housing 20 or a housing spacer depending upon the particular application. The camera housing 100 includes a top surface 106 and a bottom surface 108. The top surface 106 of the camera housing 100 is substantially dome-shaped and includes a generally pie-shaped recess 1110. The recess 110 is defined by a substantially planar bottom wall 112, sidewalls 114, 116, and a rear wall 118. In the illustrative embodiments, the rear wall 118 is substantially orthogonal to the bottom wall 112. A window 120 is positioned in the rear wall 118 of the camera housing 100 to provide a viewing port for the camera 24. The camera housing 100 may also include a pair of ports or openings 122 similar to the ports 32, 34. The ports 122 are illustratively positioned in the bottom wall 112 of the housing 100 and directed toward the window 120 such that the window 120 may be cleaned by the liquid and/or air ejected therefrom (see FIG. 7). In such embodiments, the camera housing 100 may include a corresponding pair of tubes or conduits 124 to provide the liquid or air.

Figure 5:
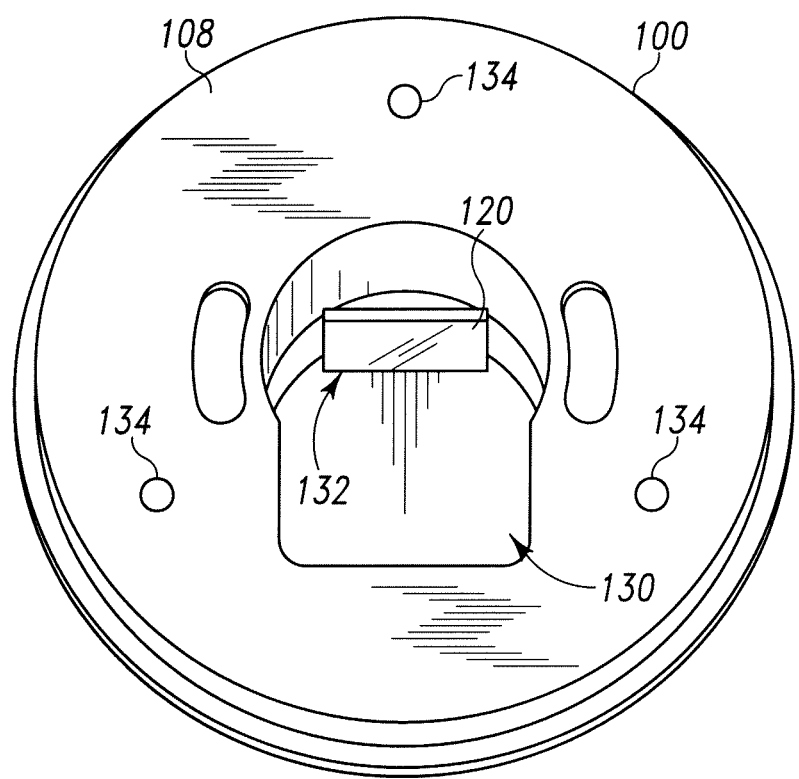
FIG. 5 is a cross-sectional view of the camera housing of FIG. 3
Figure 6:
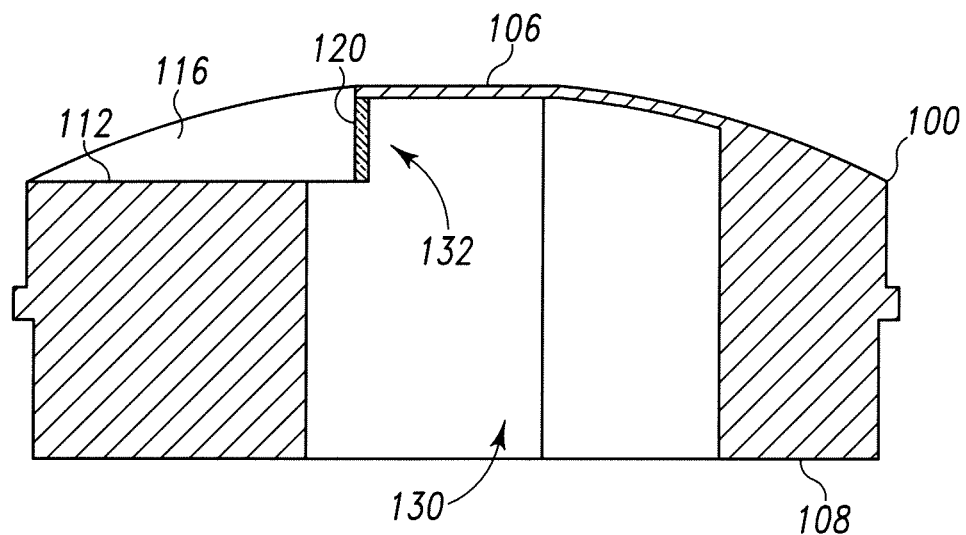
FIG. 6 is a cross-sectional view of another embodiment of the camera housing of FIG. 3.
Figure 7:
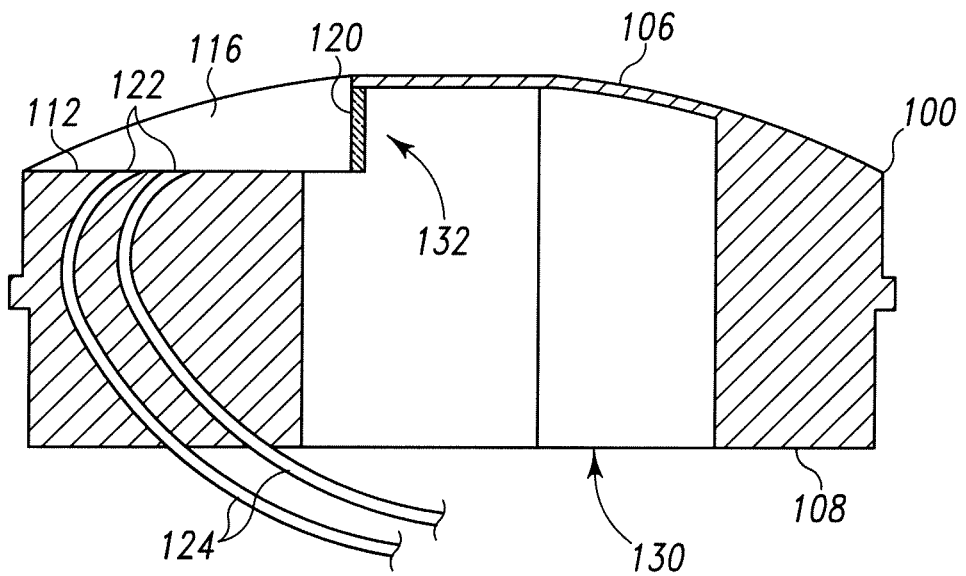
FIG. 7 is an elevational view of the camera housing of FIG. 3 having and associated camera coupled thereto.
Figure 8:
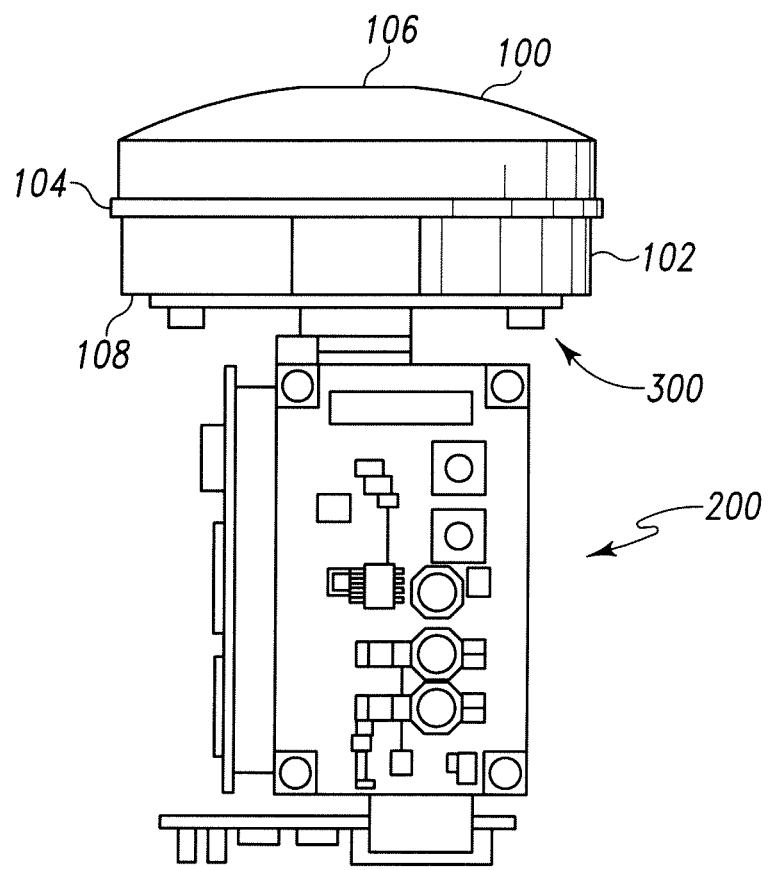
FIG. 8 is an elevational view of the camera housing and camera of FIG. 7 in a dissembled configuration.
Figure 9:
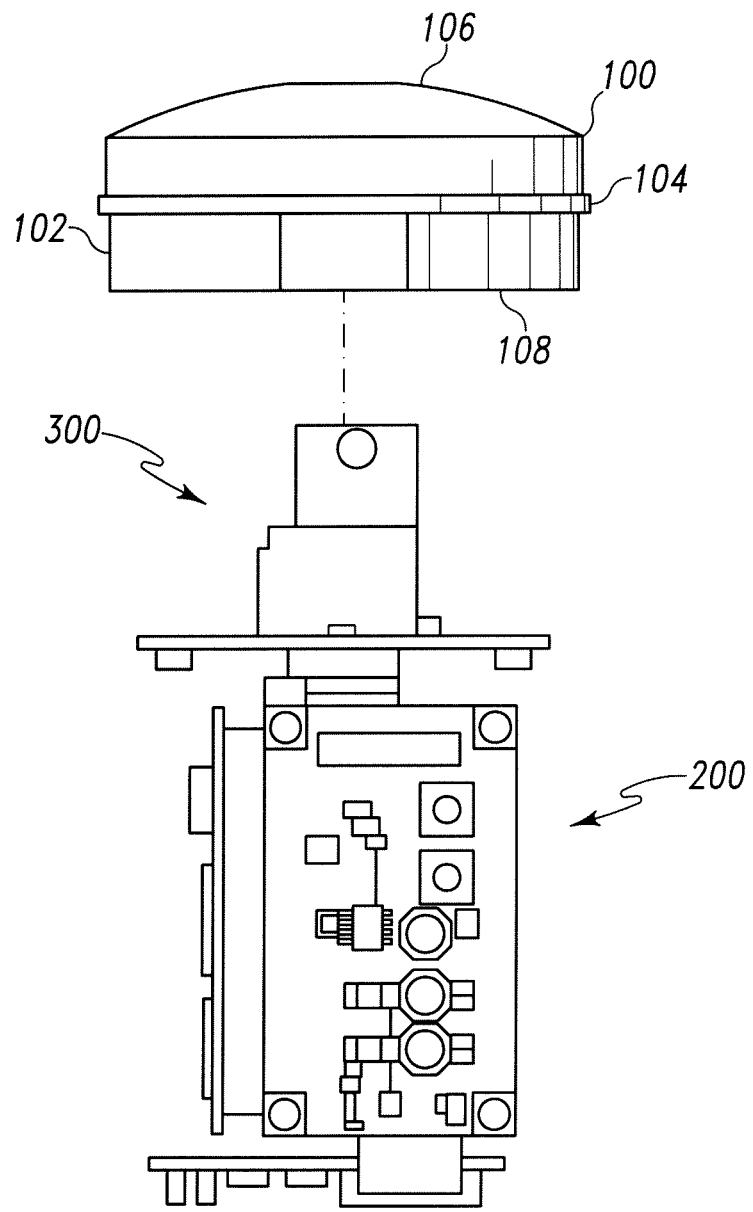
FIG. 9 is an exploded elevational view of the camera housing of FIG. 8.

The top surface 106 of the housing 100 extends upwardly from the side surface 102 at a selected angle and height so to not interfere with vehicles, animals, or persons that travel over the camera housing 100, even at high rates of speed. For example, in one embodiment, the housing 100 is shaped such that the top surface 106 extends no more than about 0.5 inches above the top surface 28 of the track 18 when the housing 100 is coupled to the support housing 20. For example, in one particular embodiment, the domed, top surface 106 extends vertically above the bottom wall 112 no more than about 0.5 inches. In another particular embodiment, the domed, top surface 106 extends vertically above the bottom wall 112 about 5/16th of an inch. Additionally, in one particular embodiment, the slope of the top surface 106 is less than 90 degrees relative to a plane defined by the bottom wall 110. In another particular embodiment, the slope of the upper surface 106 is about 60 degrees or less relative to bottom wall 110. In a further particular embodiment, the slope of the upper surface 106 is about 30 degrees or less relative to the bottom wall 110. In yet a further particular embodiment, the slope of the upper surface 106 is about 10 degrees or less relative to the bottom wall 110. Additionally, in one embodiment, the top surface 106 extends a distance of about 0.5 inches or less above the As shown in FIGS. 5-7, the camera housing 100 includes an internal cavity or chamber 130 having an opening 132 defined in the bottom surface 108. The cavity 130 is sized to receive the camera 24, a portion of the camera 24, and/or an adaptor coupled to the camera 24 as discussed in more detail below. The camera housing 100 also includes an aperture 132 in communication with the cavity 130. The window 120 is positioned in the aperture 132. The illustrative camera housing 100 is configured for use with a high definition camera, and as such, the aperture 132 and window 120 have a generally rectangular shape.

In some embodiments, the camera 24, or a portion thereof, may be positioned in the internal cavity 130. However, in embodiments wherein the high definition camera 24 is too large for such positioning, the camera 24 may be secured to the bottom surface 108 of the camera housing 100 such that the view of the lens of the camera 24 is vertical relative to the camera housing 100. As such, the bottom surface 108 may include a plurality of threaded apertures 134 to facilitate attachment of the camera 24 (or an adaptor coupled thereto) to the camera housing 100. Additionally, in such embodiments, a portion of the camera 24 may or may not be positioned in the cavity 130. Further, as discussed in more detail below, a camera adaptor may be used to redirect the view of the camera 24 outwardly through the window 120. To do so, the adaptor may include a mirror or the like as discussed in more detail below.

Referring now to FIGS. 8-13, in one particular embodiment, the camera 24 is embodied as a high definition camera 200. The high definition camera 200 may be embodied as a complete high definition camera or only a portion thereof. For example, in some embodiments, the camera 200 may be embodied as the imager electronics and devices of a high definition camera. In such embodiments, other portions of the high definition camera may be located remotely from the housing 100 such as in the support housing 20 or in the control module 14.

The camera 200 is coupled to the bottom surface 108 of the camera housing 100 via an adaptor 300. A portion of the adaptor 300 is received in the cavity 130 of the camera housing 100. Due to the relatively large size of the high definition camera 200, the adaptor 300 is used to couple the camera 200 to the housing 100 and redirect the view of the camera 200. The adaptor 300 includes a lens assembly 302, an adaptor plate 304, and a mirror housing 306. When assembled, a portion of the adaptor such as the mirror housing 306 is received in the cavity 130 of the housing 100.

Figure 10:
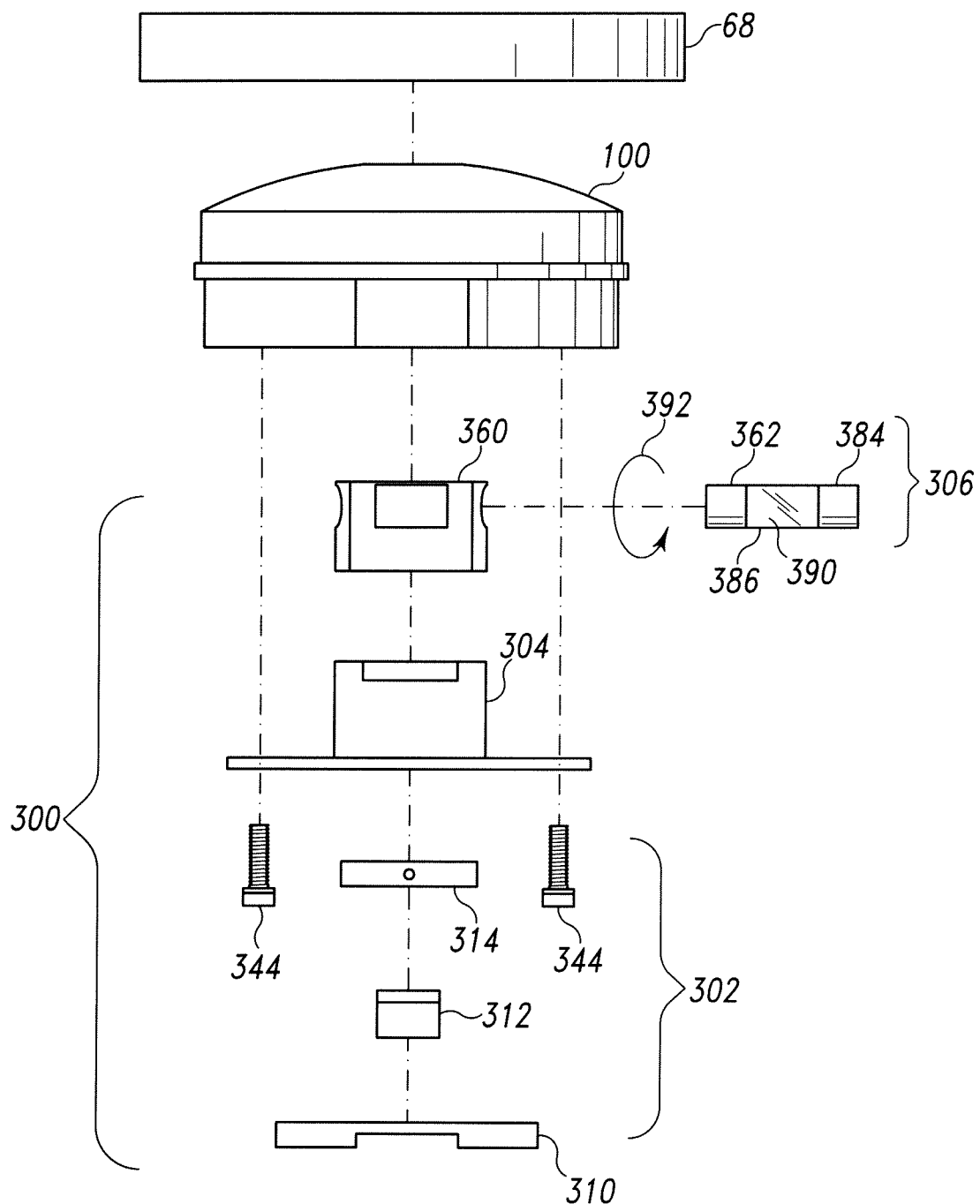
FIG. 10 is a front elevational view of on embodiment of the camera housing of the camera assembly of FIG. 8.
Figure 11:
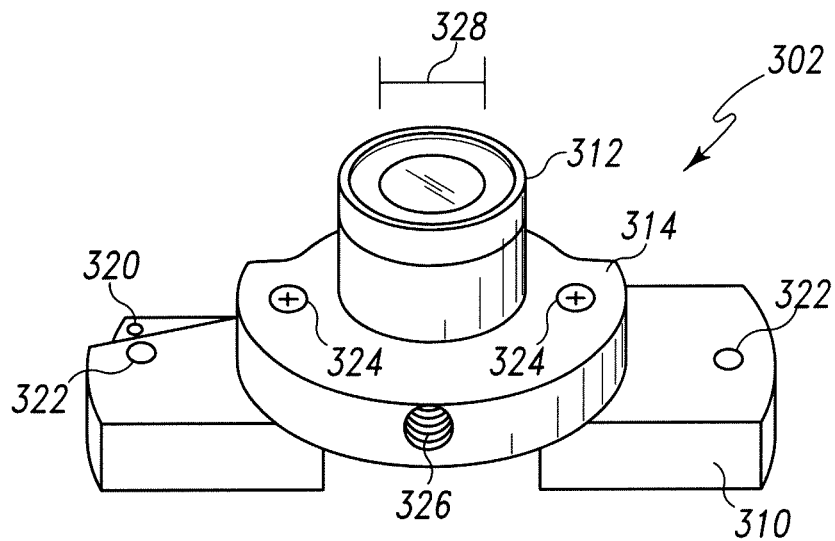
FIG. 11 is a perspective view of a lens assembly of a camera adaptor of the camera housing of FIG. 8.

As illustrated in FIGS. 10 and 11, the lens assembly 302 includes a mounting plate 310, a lens 312, and a lens focus locking ring 314. The mounting plate 310 includes a plurality of apertures 320 for securing the lens assembly 302 to the high definition camera 200 or a portion thereof such as a circuit board or the like. The mounting plate 310 also includes a plurality of threaded apertures 322 for securing the adaptor plate 304 to the lens assembly 302. The lens 312 is secured to the mounting plate 310. The lens 312 is sized to be positionable in the cavity 130 of the housing 100 and is substantially smaller than a typical high definition camera lens. For example, in one particular embodiment, the lens 312 has a diameter 328 of about 0.5 inches. The lens 312 has an adjustable focus. As such, to ensure the focus of the lens 312 is not inadvertently adjusted during use, the lens focus locking ring 314 is coupled to the lens 312 to lock the focus of the lens 312 to the desired setting. The locking ring 314 is secured to the mounting plate 310 via a pair of screws 324 and includes a threaded aperture 326 defined on a sidewall 328. A set-screw (not shown) or other securing device is threaded into the aperture 326 and contacts a side of the lends 312 to lock the focus of the lends 312.

Figure 12:
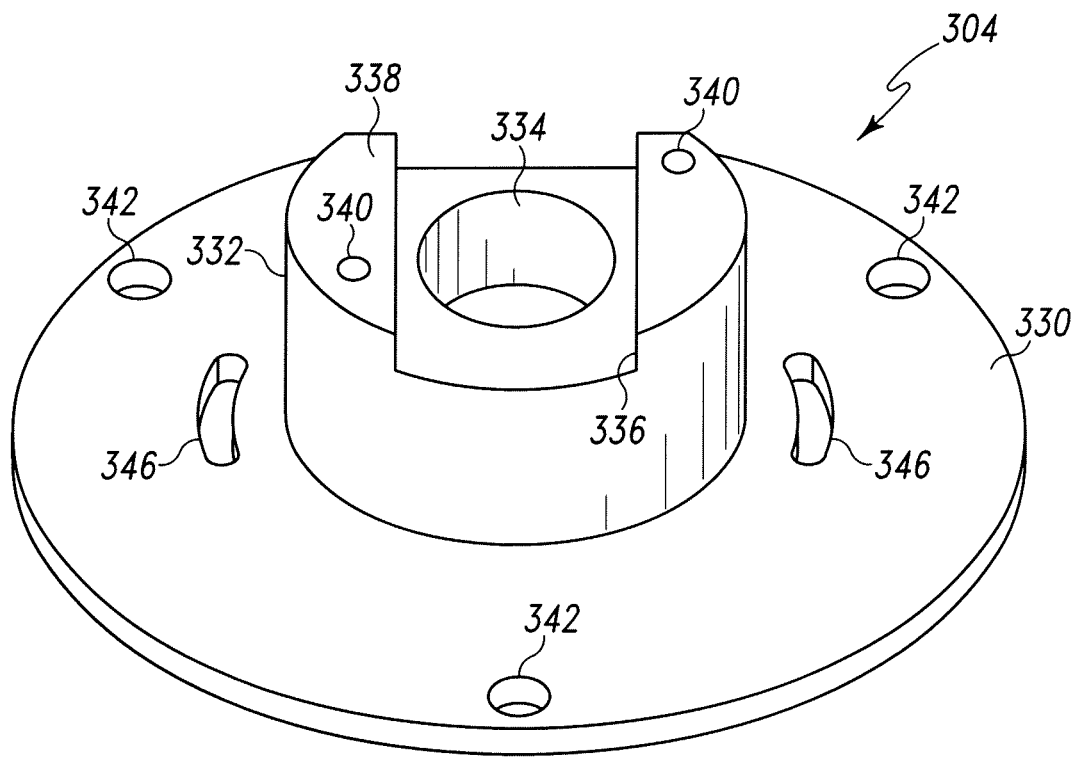
FIG. 12 is a perspective view of an adaptor plate of the camera adaptor of the camera housing of FIG. 8.

As illustrated in FIGS. 10 and 12, the adaptor plate 304 includes a substantially planar base plate 330 and a post 332 extending upwardly from the base plate 330. The post 332 illustratively has a cylindrical shape but may have other shapes in other embodiments. The post 332 includes a passageway 334 defined therethrough. The passageway 334 is sized to receive the lens 312 when the lens assembly 302 is coupled to the adaptor plate 304. In the illustrative embodiment, the post 332 also includes a slot 336 defined in a top surface 338 of the post 332. The slot 336 is sized and shaped to receive filter and iris control devices of the camera 200. In such embodiments, the height of the post 332 defines the distance between the lends 312 and the filter and iris control devices of the camera 200 (which are secured to the top of the post 332). The post 332 also includes a pair of threaded apertures 334 for securing the mirror housing 306 to the adaptor plate 304

The adaptor plate 304 is configured to be coupled to the bottom surface 108 of the camera housing 100. As such, the adaptor plate 304 includes a plurality of apertures 343 for receiving corresponding bolts or screws 344 to secure the plate 304 to the housing 110. The adaptor plate 304 also includes a pair of elongated apertures 346. The apertures 346 are useable to secure the lens assembly 302 to the adaptor plate 304 via the threaded apparatus 322 of the base plate 310 of the assembly 302.

Figure 13:
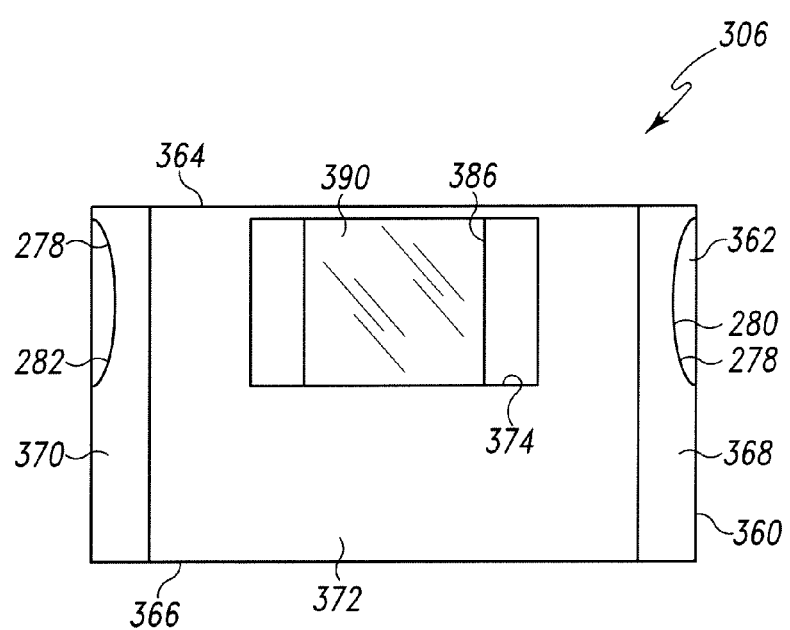
FIG. 13 is an elevational view of a mirror housing of the camera adaptor of the camera housing of FIG. 8.

As shown in FIGS. 10 and 13, the mirror housing 306 includes a housing 360 and a mirror support 362. The housing 360 includes a generally planar top surface 364 and bottom surface 366. The housing 360 also includes a pair of curved side walls 368, 370 and a substantially planar front wall 372. A window 374 is defined in the front wall 372. A cylindrical passageway 278 is defined through the housing 360 an includes an opening 280 defined in the side wall 368 and an opening 282 defined in the side wall 370. The mirror support 362 is illustratively embodied as a cylinder and includes a curved outer wall 384 (see FIG. 10). However, the mirror support 362 may have other shapes in other embodiments. The mirror support 362 includes a flat recessed area 386 defined in outer wall 364. A mirror 390 is positioned in the recessed area 386.

The mirror support 362 is insertable into the lateral passageway 278 of the housing 360. The mirror support 362 is positioned relative to the housing 360 such that the mirror 390 and window 374 are substantially in registry with each other. However, the position of the mirror 390 relative to the camera 200 may be adjusted by rotating the mirror support 362 about an arc 392 (see FIG. 11). By positioning the mirror support 362, the view of the camera 200 may be redirected by the mirror 390 through the window 374 and the window 120 of the housing 100. For example, in one embodiment, the mirror 390 is positioned at about 45 degrees relative to the camera 200 but may be positioned or tilted to other orientations to adjust the view of the camera 200. Additionally, the camera 200 may be tilted or otherwise positioned relative to the camera housing 100 to adjust the horizon of the view of the camera 200. Further, it should be appreciated that the focal length of the camera 200 may be increased via use of the mirror 390 such that the smaller lens 312 is usable with the camera 200.

Figure 14:
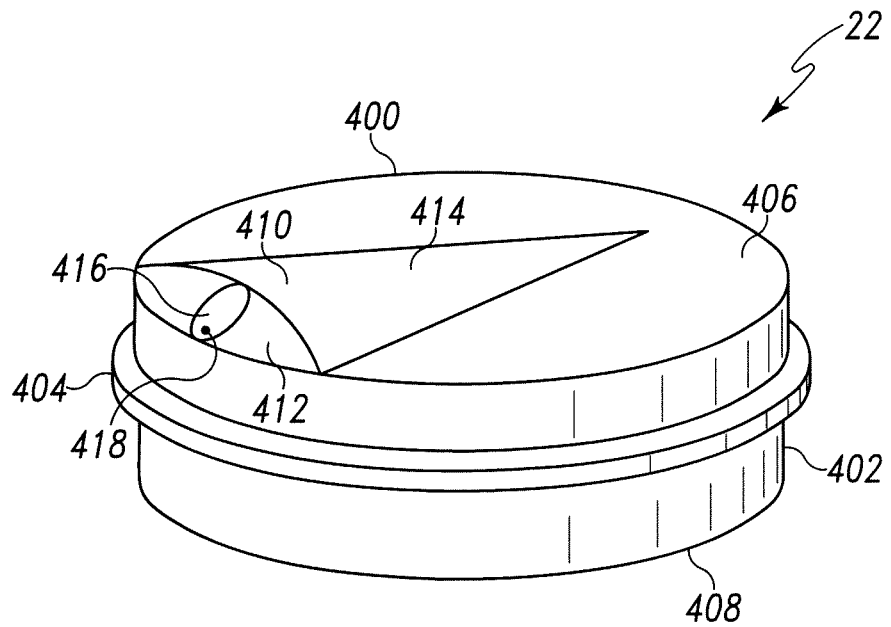
FIG. 14 is a top perspective view of another embodiment of the camera housing of FIG. 3.
Figure 15:
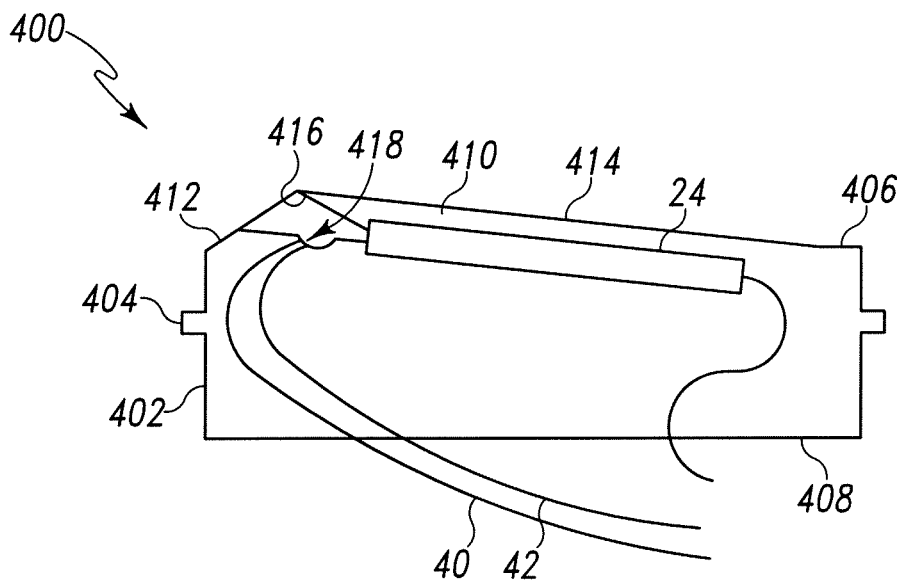
FIG. 15 is a cross-sectional view of the camera housing of FIG. 14.
Figure 16:
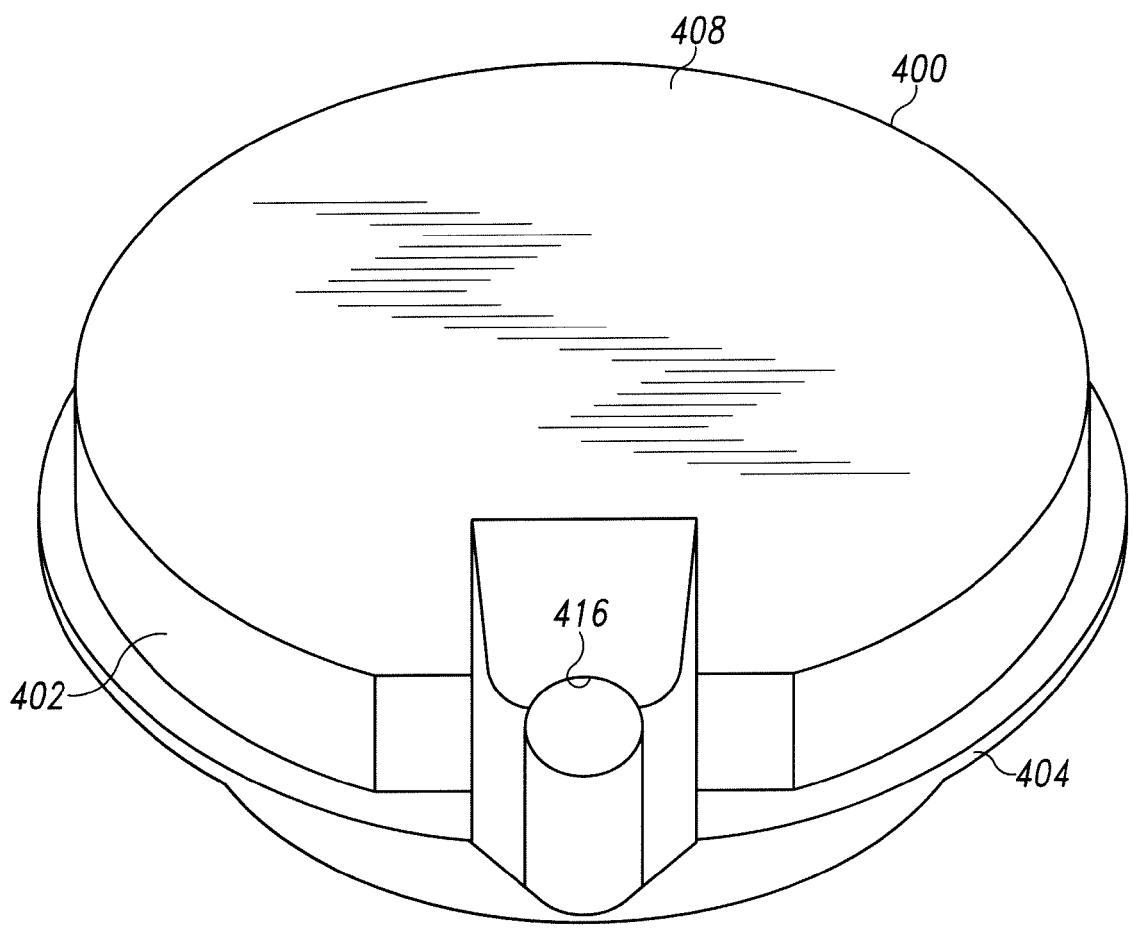
FIG. 16 is a bottom perspective view of the camera housing of FIG. 14.

Referring now to FIGS. 14-16, in another embodiment, the camera housing 22 is embodied as a camera housing 400 having a cylindrical shape defined by a curved sidewall 402. In the illustrative embodiment, the camera housing 400 has a diameter of about four inches, but may be smaller or larger in other embodiments. The housing 400 includes a lip 404 extending about the mid-section of the sidewall 402, which is used to position and secure the housing 400 to the support housing 20 or housing spacer depending upon the particular application. The camera housing 400 includes a top surface 406 and a bottom surface 408. A dome 410 extends upwardly from the top surface 406. Illustratively, the dome 410 has a triangular shape. The dome 410 includes a front surface 412 and a top surface 414. The front surface 412 extends gradually upwardly from the edge of the top surface 406. The slope of the front surface 412 is selected so as to not interfere with vehicles, animals, or persons that travel over the dome 410 even at high rates of speed. In one particular embodiment, the slope of the front surface 412 may be less than about 60 degrees relative to the top surface 406. In another particular embodiment, the slope of the front surface 412 may be less than about 30 degrees relative to the top surface 406. In a further particular embodiment, the slope of the front surface 412 may be less than about 10 degrees, such as about seven degrees, relative to the top surface 406. In the illustrative embodiment, the dome 410 extends upwardly from the top surface 406 about 0.1875 inches. Similar to the front surface 412, the top surface 414 of the dome 410 slopes gradually downwardly from the front surface 412. The overall length of the top surface 414 may be selected such that the slope of the top surface 414 is slight or otherwise gradual. For example, as illustrated in FIG. 14, the top surface 414 may extend almost to the edge of the top surface 406 of the camera housing 400.

An aperture or passageway 416 is defined in the front surface 412 of the triangular dome 410. The passageway 416 provides a viewing port for the camera 24. The passageway 416 may or may not include a window at the opening of the passageway 416. The camera 24, or a portion thereof, is be positioned in the passageway 416. In the illustrative embodiment, the camera 24 is a standard definition camera, but may be a high definition camera in other embodiments. Additionally, the camera housing 400 of FIG. 14 includes one or more ports or openings 418 similar to the ports 32, 34. The ports 118 are illustratively positioned in the passageway 416 such that liquid and/or air ejected therefrom is received on a window of the housing 400 or a lens of the camera 24.

Figure 17:
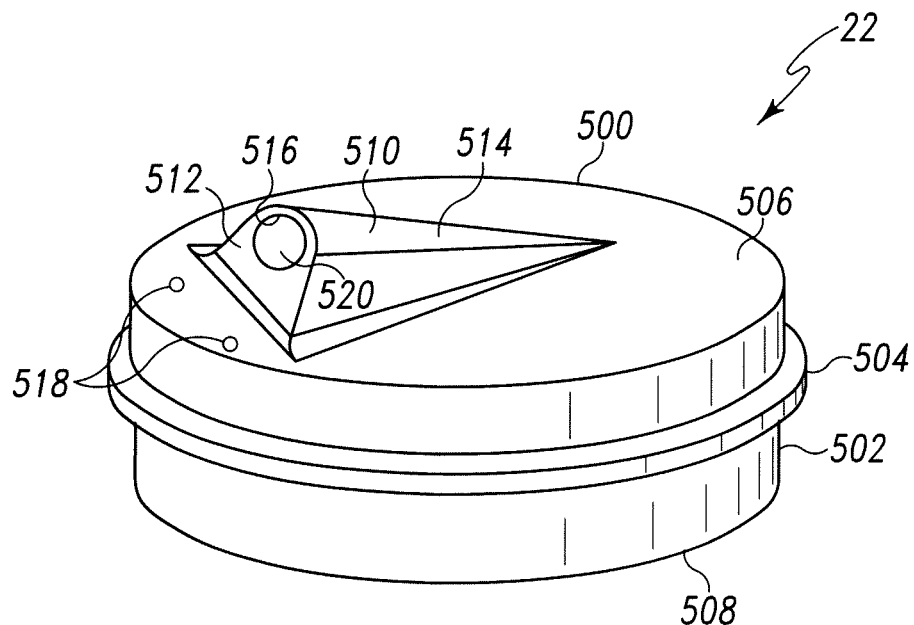
FIG. 17 is a top perspective view of another embodiment of the camera housing of FIG. 3.
Figure 18:
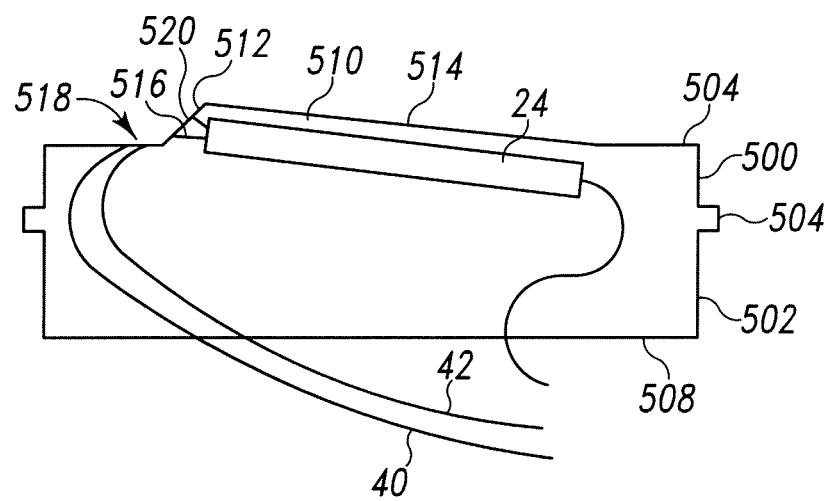
FIG. 18 is a cross-sectional view of the camera housing of FIG. 17.
Figure 19:
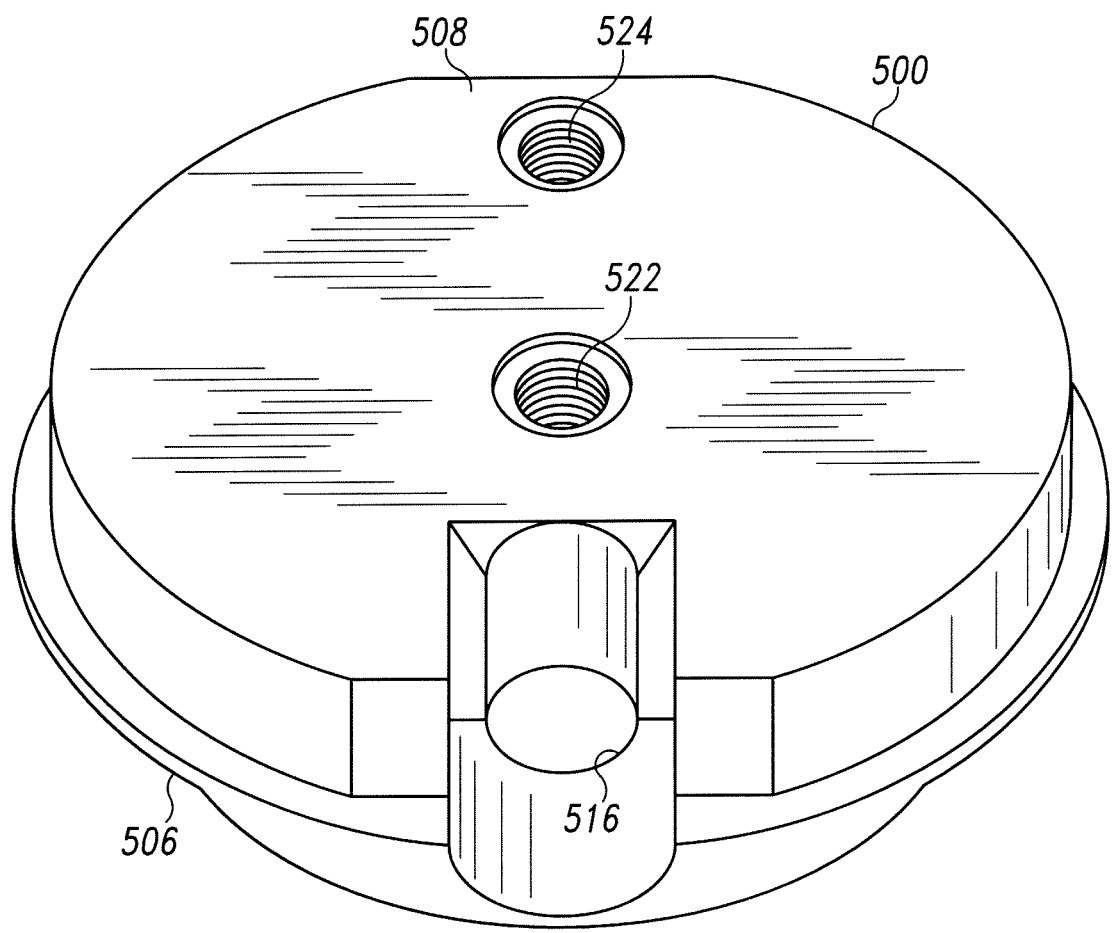
FIG. 19 is a bottom perspective view of the camera housing of FIG. 17.

Referring now to FIGS. 17-19, in another particular embodiment, the camera housing 22 is embodied as a camera housing 500 having a cylindrical shape defined by a curved sidewall 502. The housing 500 includes a lip 504 extending about the mid-section of the sidewall 502, which is used to position and secure the housing 500 to the support housing 20 or housing spacer depending upon the particular application. The camera housing 500 includes a top surface 506 and a bottom surface 508. A triangular protrusion 510 extends upwardly from the top surface 506. The protrusion 510 includes a front surface 512 and a top surface 514. The front surface 512 extends upwardly from the top surface 506 of the camera housing 500 at a selected angle and height so as to not interfere with vehicles, animals, or persons that travel over the protrusion 510 even at high rates of speed. In one particular embodiment, the slope of the front surface 512 may be about 90 degrees or less relative to the top surface 506. In another particular embodiment, the slope of the front surface 512 may be about 60 degrees or less relative to the top surface 506. Similar to the front surface 412, the top surface 514 of the protrusion 510 slopes gradually downwardly from the front surface 512. The overall length of the top surface 514 may be selected such that the slope of the top surface 514 is slight or otherwise gradual. For example, as illustrated in FIG. 17, the top surface 514 may extend almost to the edge of the top surface 506 of the camera housing 200.

An aperture or passageway 516 is defined in the front surface 512 of the protrusion 510. The passageway 516 provides a viewing port for the camera 24. The passageway 516 includes a window 520 positioned at the opening of the passageway 516. The camera 24, or a portion thereof, is be positioned in the passageway 516 with the lens of the camera 24 position toward the window 520. In the illustrative embodiment, the camera 24 is a standard definition camera, but may be a high definition camera in other embodiments. Additionally, the camera housing 500 may include a pair of openings or ports 518 similar to the ports 32, 34. The ports 518 are illustratively positioned in the top surface 506 of the housing 500 and directed toward the window 516 such that the window 516 may be cleaned by the liquid and/or air ejected therefrom.

In some embodiments as illustrated in FIG. 19, the camera housing 500 may include a threaded aperture 522 centrally defined in the bottom surface 508. The camera 24 is secured in place in the passageway 516 via a retainer plug positioned in the threaded aperture 522. A set-screw or the like is threaded into the aperture 522, which pushes the retainer plug into contact with the camera 24. In this way, the retainer plug secures the camera 24 in place. The camera housing 500 may also include a threaded aperture 524 defined in the bottom surface 508. The threaded aperture 524 allows access to the window 520 for replacement and additional maintenance. A retainer plug and set-screw may also be used in the threaded aperture 524 to hold the window 520 in place.

Figure 20:
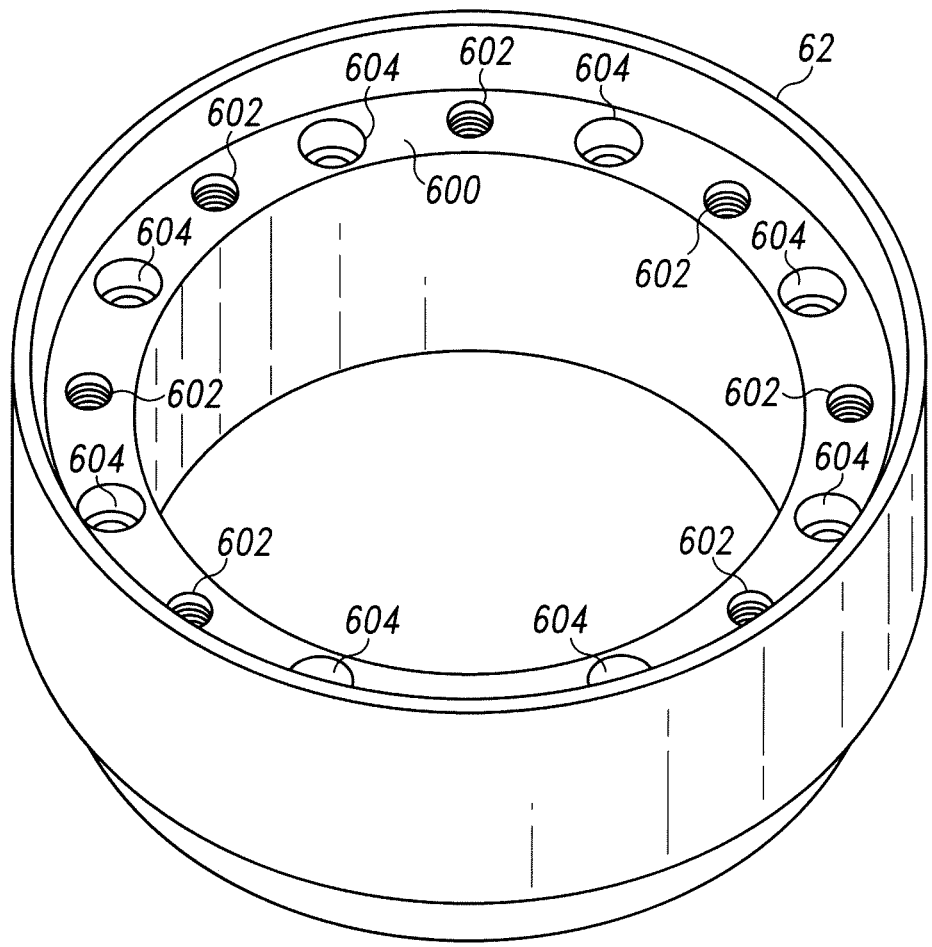
FIG. 20 is a perspective view of a housing spacer of the surface camera assembly of FIG. 2.
Figure 21:
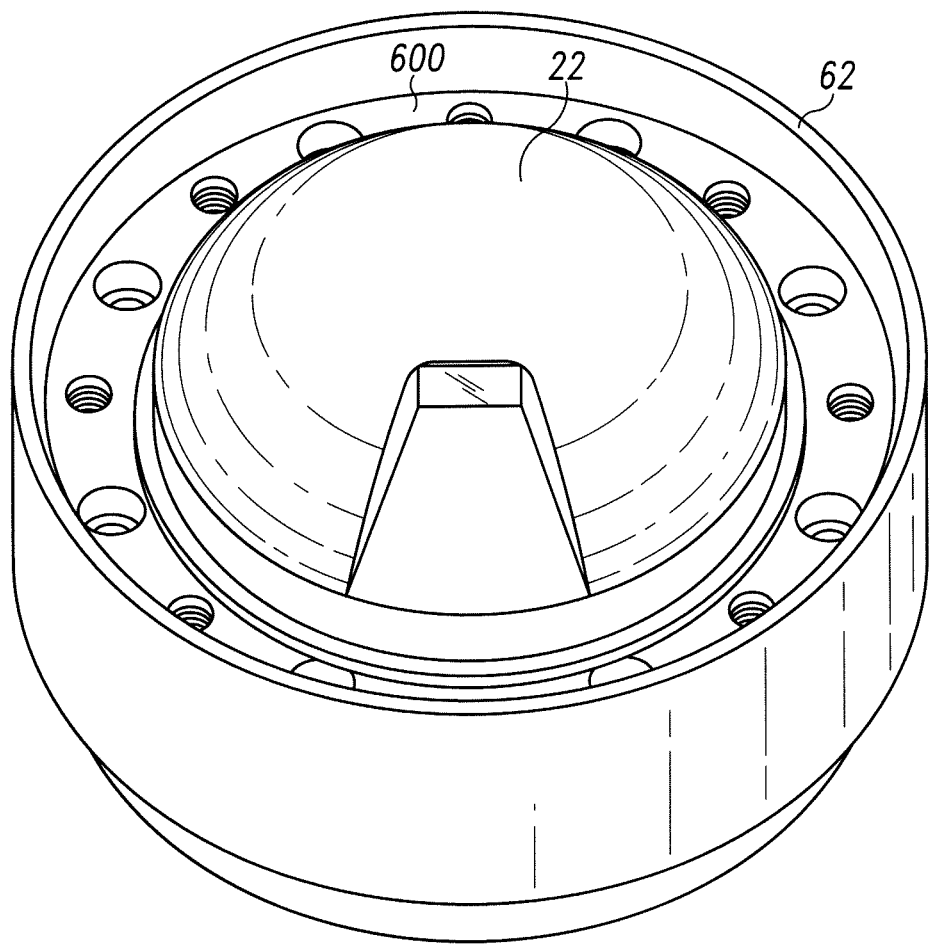
FIG. 21 is a perspective view of the housing spacer of FIG. 20 having the camera housing of FIG. 3 positioned therein.
Figure 22:
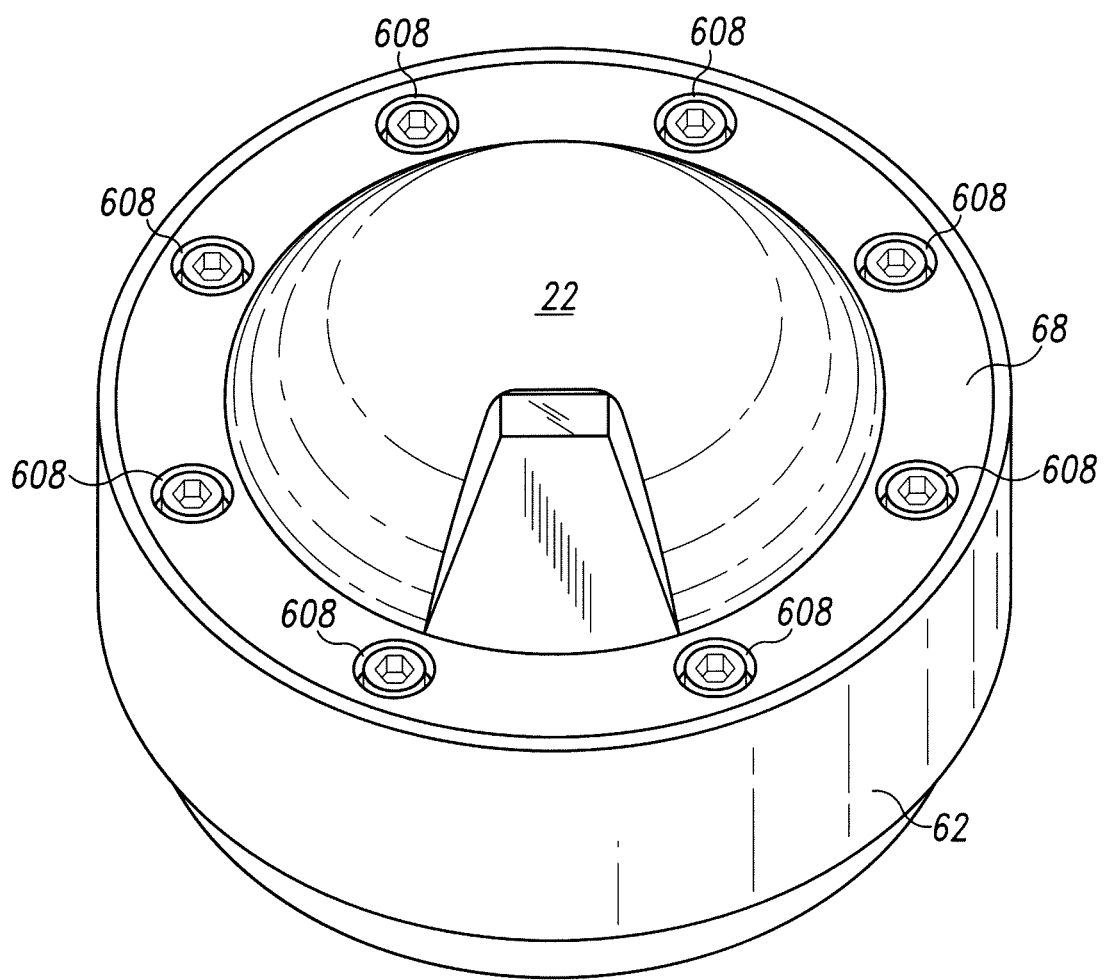
FIG. 22 is a perspective view of the housing spacer of FIG. 20 having the camera housing of FIG. 3 secured thereto via a retainer ring.
Figure 23:
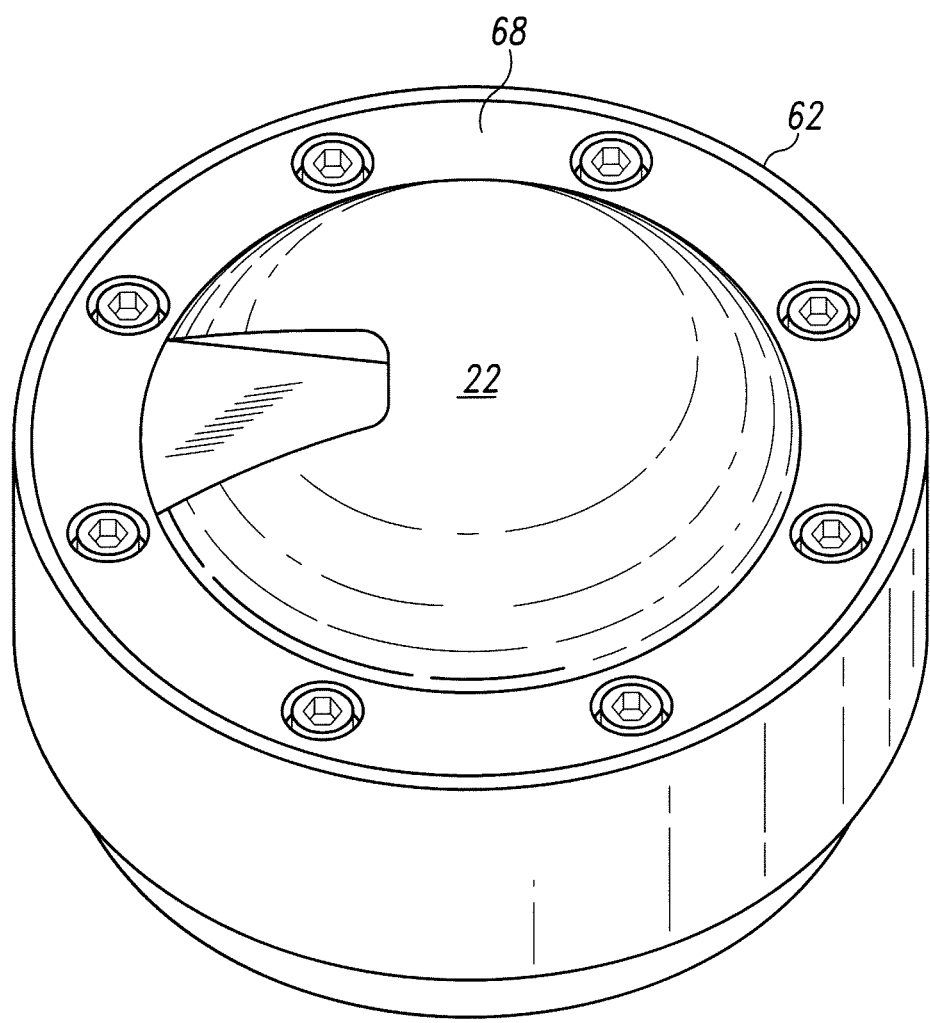
FIG. 23 is a perspective view of the housing spacer assembly of FIG. 22 having the camera housing rotated to a different position.

Referring now to FIG. 20, in one embodiment, the large housing spacer 62 includes a ledge 600 having a number of threaded apertures 602 and recessed threaded apertures 604. As shown in FIG. 21, the camera housing 22 may be coupled to the housing spacer 62 (or support housing 20) by placing the camera housing 22 such that the lip 104, 404, 504 rests on a portion of the ledge 600 of the housing spacer 62. As illustrated in FIG. 22, the camera housing 22 may be secured in place by the retainer ring 68, which is placed around the camera housing 22 and rests on the remaining portion of the ledge 600. The retainer ring 68 includes a number of recessed apertures 608. The retainer ring 68 and camera housing 22 may be secured in place by threaded bolts, set-screws, or other fasteners through the apertures 608 and into the threaded apertures 602 of the housing spacer 62. The camera housing 22 is held in place via the compression forces between the retainer ring 68 and the housing spacer 62. As shown comparatively in FIGS. 22 an 23, the camera housing 22 may be secured to the housing spacer 62 in one of a plurality of orientations.

Figure 24:
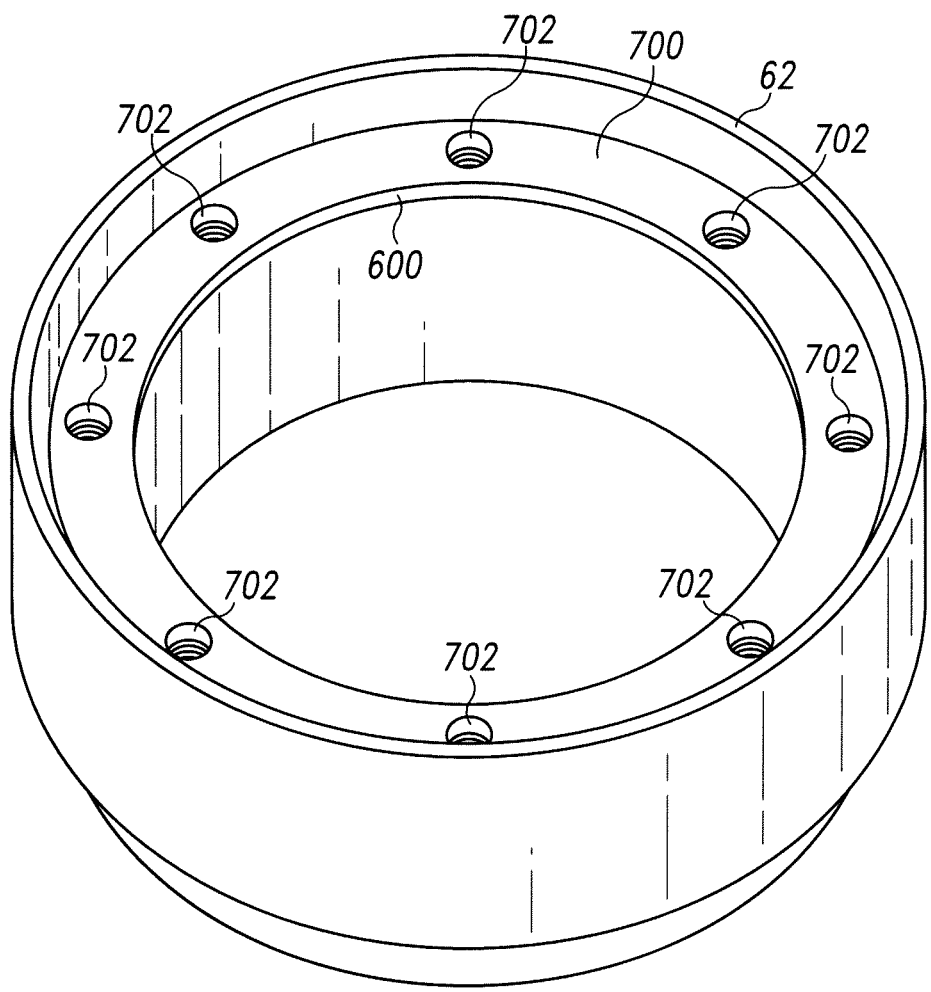
FIG. 24 is a perspective view of the housing spacer of FIG. 21 having one of a camera housing spacers positioned therein.
Figure 25:
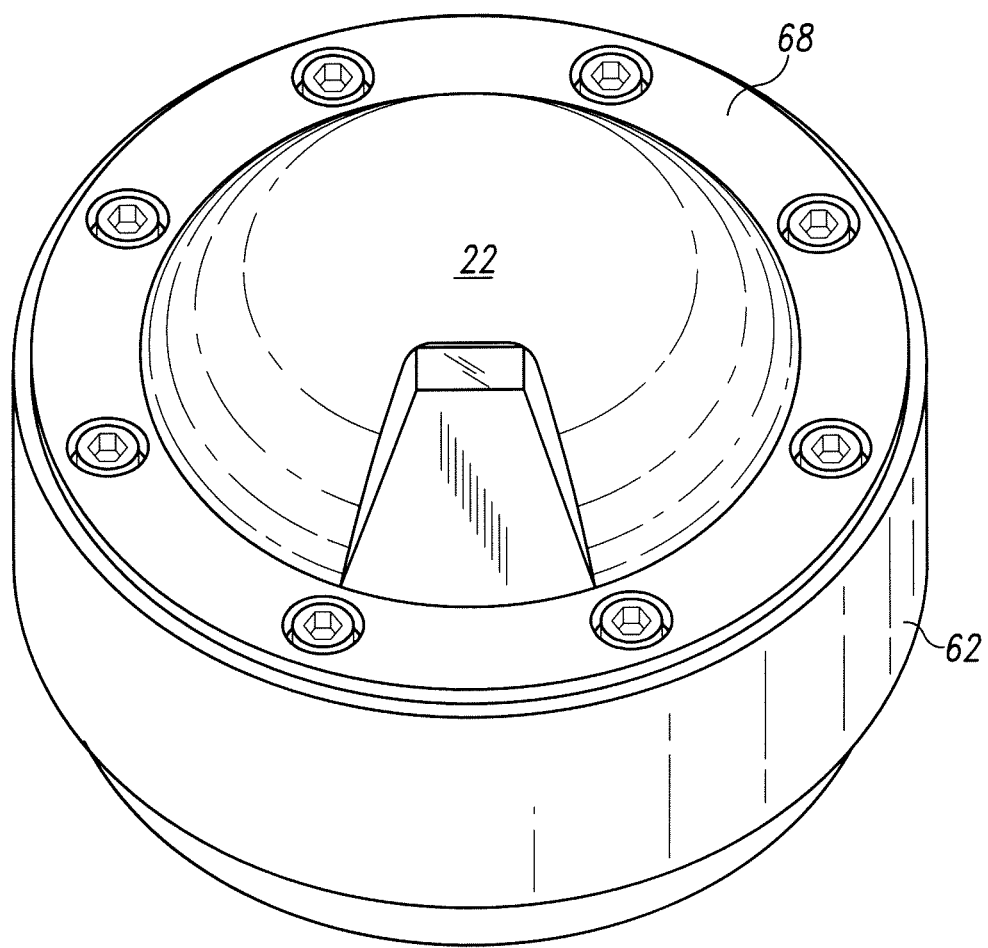
FIG. 25 is a perspective view of the housing spacer assembly of FIG. 24 having the camera housing of FIG. 3 secured thereto via a retainer ring.
Figure 26:
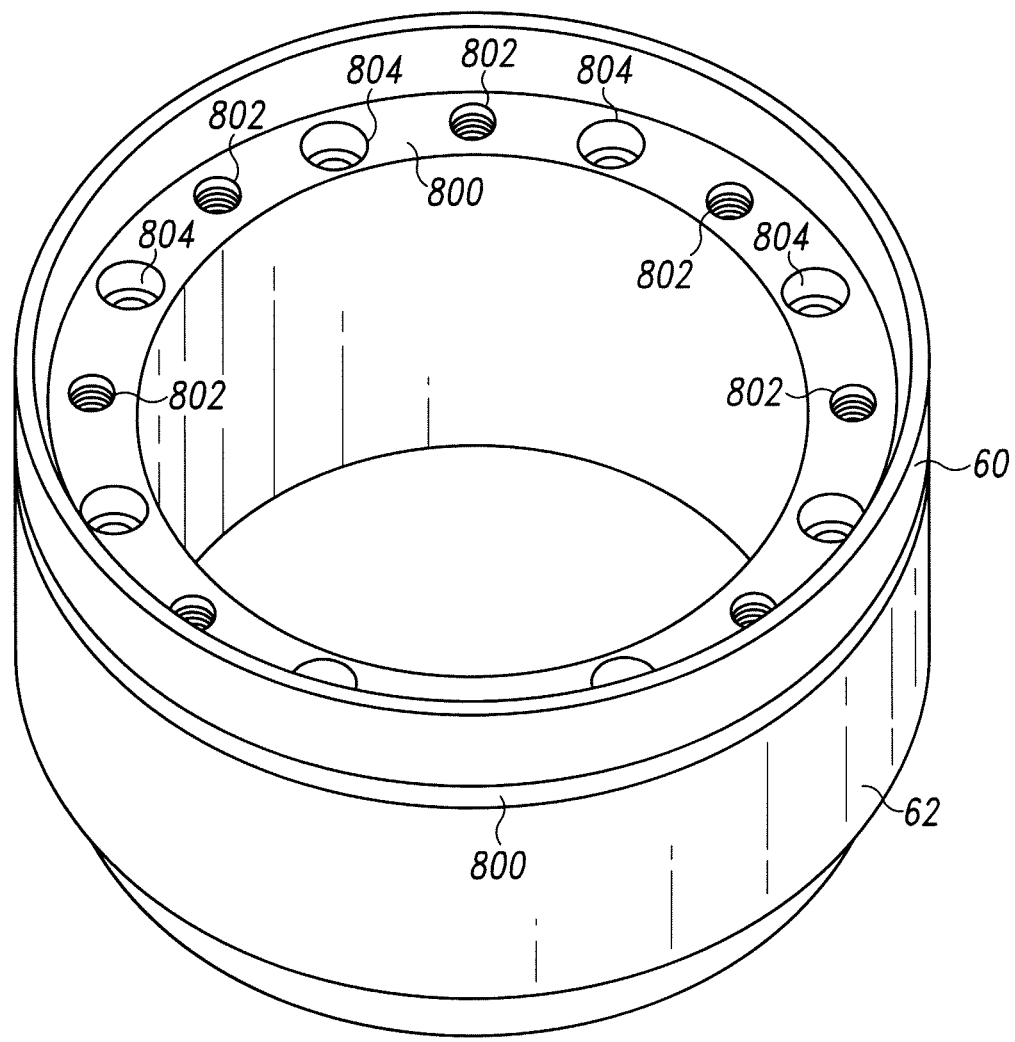
FIG. 26 is a perspective view of the housing assembly of FIG. 29 having a housing spacer ring positioned therebetween.

Referring now to FIG. 24, one or more camera housing spacers 700 may be used in some embodiments. The housing spacers 700 have a toroidal shape and include a number of apertures 702. The housing spacers 700 may have various thicknesses. In use, one or more camera housing spacers 700 may be placed on the ledge 400 of the housing spacer 62 (or the support housing 20 or spacer 60). The camera housing 22 may be secured to the housing spacer 62 using the retainer ring 68 as described above. As shown in FIG. 25, because of the positioning of the camera housing spacers 700, the camera housing 22 is elevated relative to the housing spacer 62. As such, the spacers 700 may be used to properly position the camera housing 22 and camera 24 relative to the track 18.

Figure 28:
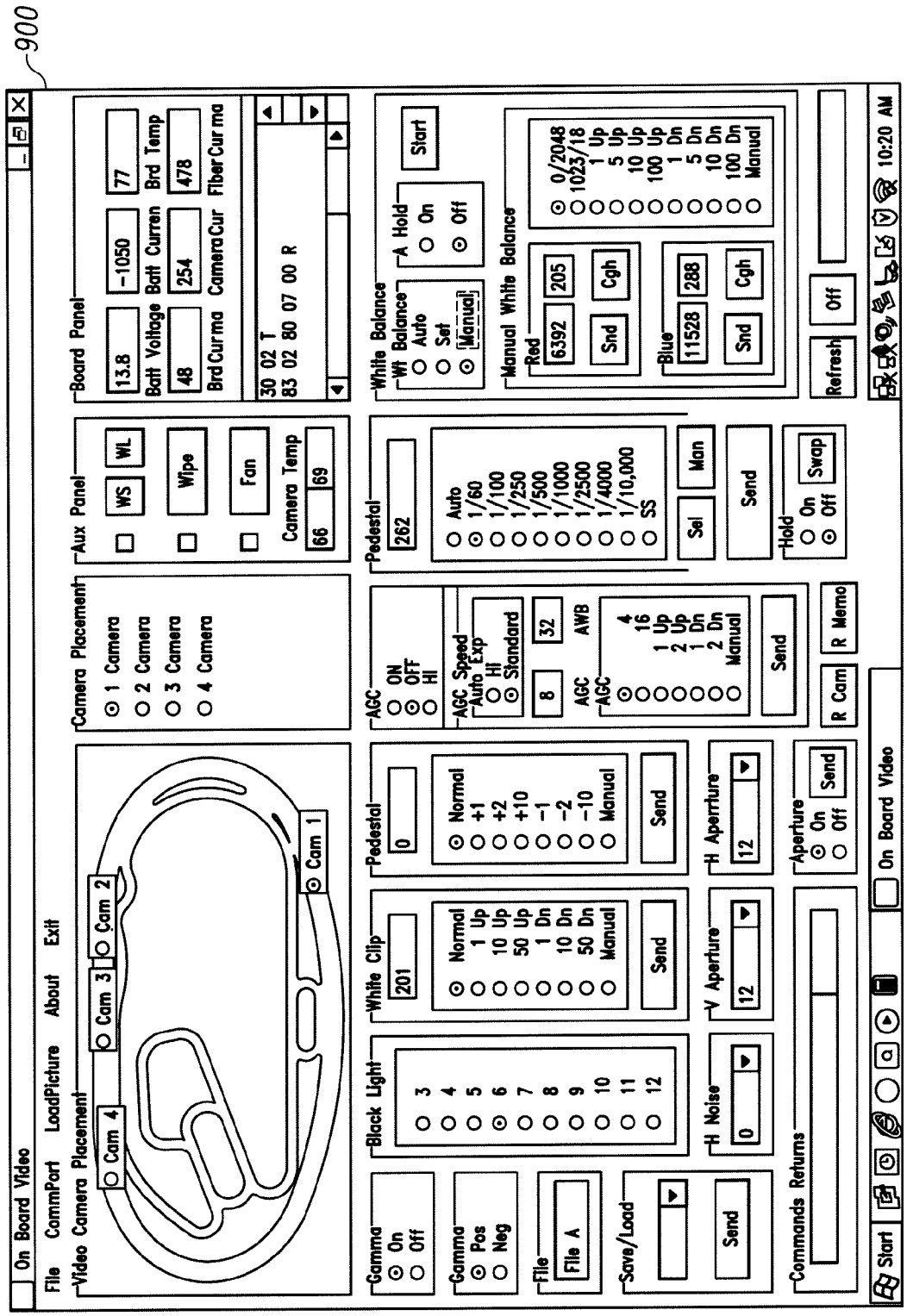
FIG. 28 is a screenshot of a software program for monitoring multiple surface cameras.

As discussed above, in addition to or in place of the "large" housing spacer 62, the "small" housing spacer 60 may be used in some embodiments. The housing spacer 60 is substantially similar to the housing spacer 62, except that that the spacer 60 has a smaller height. As illustrated in FIG. 28, the housing spacer 62 also includes a ledge 800 having a number of threaded apertures 802 and recess threaded apertures 804. The housing spacer 60 may be used with the housing spacer 62 to form a housing spacer of the appropriate size. Additionally adjustments to the height of the housing may be achieved via use of a number of ring spacers 806. The ring spacers 806 are of various thicknesses and have an inner and outer diameter that is approximately equal to the inner and outer diameter of the spacers 60, 62, respectively. The ring spacers 806 may be positioned between the housing spacers 60, 62 (or between the housing 20 and one of the housing spacers 60, 62) to provide additional spacing.

Figure 27:
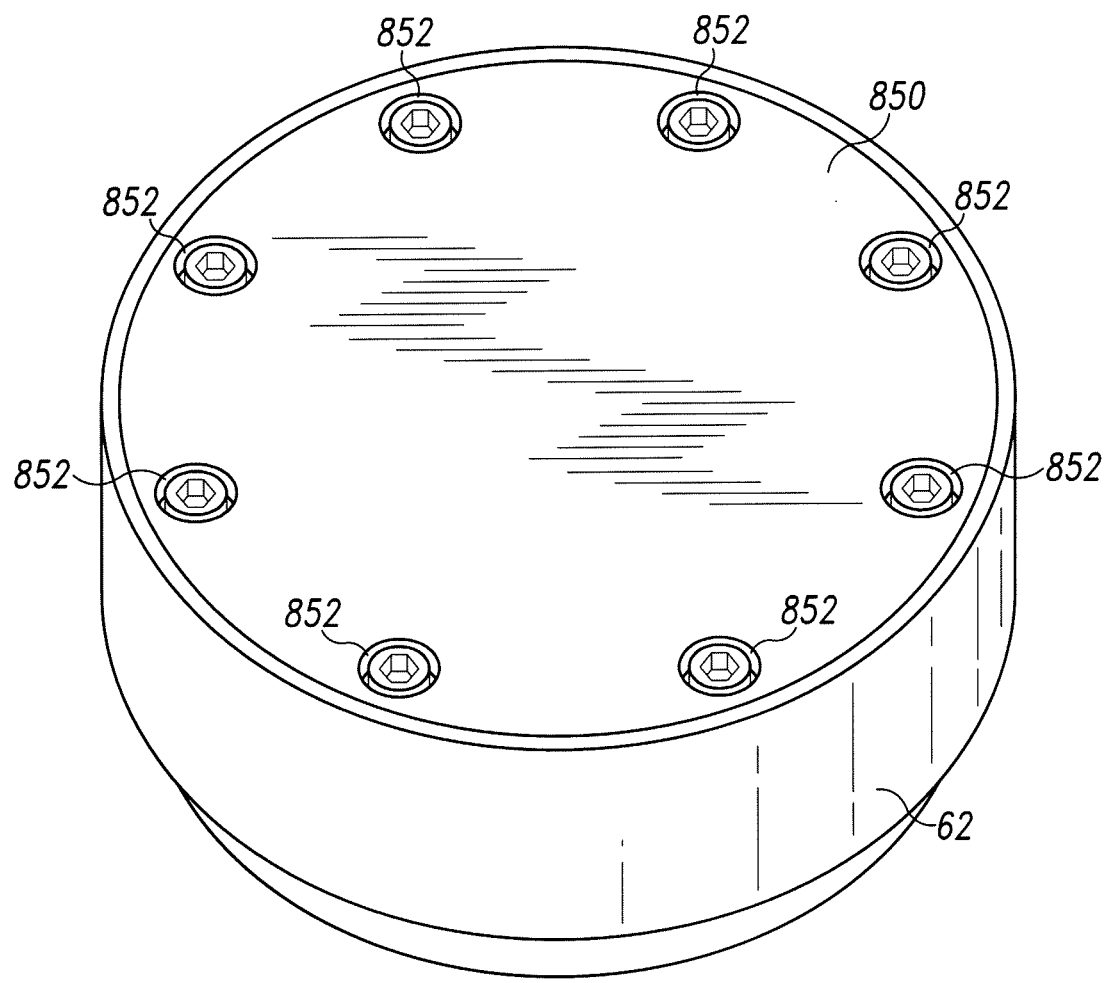
FIG. 27 is a perspective view of one embodiment of a blank cover coupled to the housing spacer of FIG. 20.

Referring now to FIG. 27, when the camera 24 is not in use, the camera housing 22 may be removed from the surface camera assembly 20. To avoid debris falling into the housing 20 and any associated spacers, a housing cap or lid 850 may be secured to the housing 20 or spacers 60, 62. The housing cap 850 is sized to be positioned in the housing 20 or spacers 60, 62 and rests on the ledge 600, 800 when so positioned. The housing cap 850 includes a number of recessed apertures 852. The housing cap 850 may be secured to the housing 20 or spacers 60, 62 by threaded bolts, set-screws, or other securing devices. The housing cap 850 is formed from a material rigid enough to support the traffic of the track 18. For example, the housing cap 850 may be formed from steel, cast aluminum, ceramic, or plastic.

During use, a control circuit of the control module 14 is configured to control the camera 24 and process video and images received therefrom. The processed video/images are transmitted to the production center 16 via the interconnects 52. The video/images from each camera 24 may be monitored in the production center 16. To do so, one or more computing devices may execute a software algorithm for monitoring the cameras 24. For example, as illustrated in FIG. 28, a software control panel 900 may be displayed on a computer monitor to a user of the production center 16. The control panel 900 allows the user to monitor each camera 24 and adjust particular aspects of the camera. Additionally, in embodiments including the actuator 30 and ports 32, 34, the user may control the actuator 30 via the control panel 900 to move the camera housing 22 to the desired orientation. Additionally, the user may operate the control panel 900 to activate one or more of the nozzles 32, 34 to clean the lens of the camera 24 and/or window of the cameral housing 22.

While the disclosure has been illustrated and described in detail in the drawings and foregoing description, such an illustration and description is to be considered as exemplary and not restrictive in character, it being understood that only illustrative embodiments have been shown and described and that all changes and modifications that come within the spirit of the disclosure are desired to be protected.

There are a plurality of advantages of the present disclosure arising from the various features of the systems, devices, and assemblies described herein. It will be noted that alternative embodiments of the systems, devices, and assemblies of the present disclosure may not include all of the features described yet still benefit from at least some of the advantages of such features. Those of ordinary skill in the art may readily devise their own implementations of the systems, devices, and assemblies that incorporate one or more of the features of the present invention and fall within the spirit and scope of the present disclosure as defined by the appended claims.

The invention claimed is:

1. A camera system comprising:
a support housing configured to be embedded in the surface of a track;
a camera housing coupleable to the support housing and including a domed upper surface and a bottom surface, the camera housing having a window positioned in a recessed area of the domed upper surface and a cavity defined in the bottom surface in a central location of the bottom surface; wherein the recess area of the domed upper surface has a generally wedge shape and is defined by a bottom wall, a first side wall, a second side wall, and a back wall, the window of the camera housing being positioned in the back wall; wherein the camera housing includes a port defined in the domed upper surface, the port including an opening pointed toward the window; further comprising a conduit positioned in the port and an actuator operable to rotate the camera housing with respect to the support housing to move the camera housing to different camera angles; and a high definition camera secured to the camera housing and comprising:
- an adaptor comprising (i) a base plate secured to the bottom surface of the camera housing and (ii) a post extending upwardly from the base plate and received in the cavity defined in the bottom surface of the camera housing;
- a lens assembly comprising (i) a mounting plate secured to the base plate of the adaptor, (ii) a camera lens extending upwardly through a passageway of the post of the adaptor such that the camera lens is positioned in the cavity of the bottom surface of the camera housing and directed toward the domed upper surface, and (ii) a locking ring having an internal first passageway through which the camera lens is received and a second passageway housing a fastener engagable to lock a focus of the camera lens in the first passageway and disengagable to allow adjustment of the focus of the camera lens; and
- a mirror assembly comprising (i) a mirror housing secured to a distal end of the post of the adaptor, the mirror housing including a rotatably adjustable mirror support and (ii) a mirror received in the mirror support and positioned in the cavity of the bottom surface of the camera housing to redirect a field of view of the camera lens through the window of the camera housing.

2. The camera system of claim 1, wherein the support housing is configured to be embedded in the surface of a track selected form the group consisting of: a motor-sports track, a public street, and an airport runway.

3. The camera system of claim 1, wherein the position of the mirror is adjustable relative to the lens of the high definition camera.

4. The camera system of claim 1, wherein the lens has a lens diameter of less than about 0.75 inches.

5. The camera system of claim 4, wherein the has a lens diameter of about 0.5 inches.

6. The camera system of claim 1 wherein at least one spacer is between the support housing and the camera housing for adjusting the height of the cameral housing relative to the support housing.

7. The camera system of claim 1, wherein the camera housing includes a microphone.

8. The camera system of claim 1, wherein the actuator is located in the support housing.

9. A track comprising:
a top road surface;
a cylindrical housing embedded in the top surface, the housing having a rim substantially flush with the top surface;
a camera housing coupled to the cylindrical housing, the camera housing including a domed top surface, a window positioned in the domed top surface, and a bottom surface including a cavity defined in a central location of the bottom surface, the window being substantially flush with the top road surface; wherein the domed top surface includes a recess area having a generally wedge shape and defined by a bottom wall, a first side wall, a second side wall, and a back wall, the window of the camera housing being positioned in the back wall; wherein the camera housing includes a port defined in the domed top surface, the port including an opening pointed toward the window; further comprising a conduit positioned in the port and an actuator operable to rotate the camera housing with respect to a support housing to move the camera housing to different camera angles; and
a high definition camera coupled to the camera housing and configured to generate image data from a vantage point defined on the top road surface, wherein the high definition camera comprises:
- an adaptor comprising (i) a base plate secured to the bottom surface of the camera housing and (ii) a post extending upwardly from the base plate and received in the cavity defined in the bottom surface of the camera housing;
- a lens assembly comprising (i) a mounting plate secured to the base plate of the adaptor, (ii) a camera lens extending upwardly through a passageway of the post of the adaptor such that the camera lens is positioned in the cavity of the bottom surface of the camera housing and directed toward the domed top surface, and (ii) a locking ring having an internal first passageway through which the camera lens is received and a second passageway housing a fastener engagable to lock a focus of the camera lens in the first passageway and disengagable to allow adjustment of the focus of the camera lens; and
- a mirror assembly comprising (i) a mirror housing secured to a distal end of the post of the adaptor, the mirror housing including a rotatably adjustable mirror support and (ii) a mirror received in the mirror support and positioned in the cavity of the bottom surface of the camera housing to redirect a field of view of the camera lens through the window of the camera housing, wherein the camera housing is coupled to the cylindrical housing in one of a plurality of orientations such that the field of view of the lens of the high definition camera is adjustable based on the orientation of the camera housing relative to the support housing.

10. The track of claim 9, wherein the domed top surface extends above the top road surface no more than 0.5 inches.

* * * * *